US011887760B2

(12) United States Patent
Ara et al.

(10) Patent No.: US 11,887,760 B2

(45) Date of Patent: Jan. 30, 2024

(54) SOFT MAGNETIC ALLOY, MAGNETIC CORE, AND MAGNETIC COMPONENT

(71) Applicant: TDK CORPORATION, Tokyo (JP)

(72) Inventors: Kensuke Ara, Tokyo (JP); Hajime Amano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/519,773

(22) Filed: Nov. 5, 2021

(65) Prior Publication Data

US 2022/0148773 A1 May 12, 2022

(30) Foreign Application Priority Data

Nov. 12, 2020 (JP) ................................ 2020-188805
Aug. 30, 2021 (JP) ................................ 2021-140532

(51) Int. Cl.
*H01F 1/153* (2006.01)
*C22C 45/02* (2006.01)

(52) U.S. Cl.
CPC ......... *H01F 1/15308* (2013.01); *C22C 45/02* (2013.01); *H01F 1/15333* (2013.01)

(58) Field of Classification Search
CPC ............. H01F 1/14–28; H01F 1/15308; H01F 1/15325; H01F 1/15333; H01F 1/14708–14758; H01F 1/147; H01F 1/14733; H01F 1/14766; H01F 1/14791; H01F 27/255; C22C 45/02; C22C 2202/02; C22C 33/02; B22F 1/07; B22F 2998/10
See application file for complete search history.

(56) References Cited

U.S. PATENT DOCUMENTS

2017/0148554 A1* 5/2017 Kudo .................. H01F 1/15366
2018/0218811 A1* 8/2018 Harada ............... H01F 1/15325
2019/0214171 A1* 7/2019 Yoshidome ......... H01F 1/14708
2019/0355514 A1* 11/2019 Petzold ..................... B32B 7/12
2020/0291507 A1* 9/2020 Ara ........................... H01F 1/14

FOREIGN PATENT DOCUMENTS

JP H07-335419 A * 12/1995 ......... H01F 1/15308
JP H07-335419 A 12/1995

OTHER PUBLICATIONS

Suzuki et al, "High Saturation Magnetization and Soft Magnetic Properties of bcc Fe—Zr—B and Fe—Zr—B—M (M=Transition Metal) Alloys with Nanoscale Grain Size", 1991. Materials Transactions, JIM, vol. 32, No. 1, pp. 93-102. (Year: 1991).*

* cited by examiner

*Primary Examiner* — Brian D Walck
*Assistant Examiner* — Danielle M. Carda
(74) *Attorney, Agent, or Firm* — Oliff PLC

(57) ABSTRACT

There is provided a soft magnetic alloy comprising a composition expressed by a formula of $(Fe_{(1-\alpha)}A_{\alpha})_{(1-m-x-y)}M_mX_xY_y$, in which M represents at least one selected from the group consisting of Zr and Hf, X represents at least one selected from the group consisting of Ni, Mn, Cu, Co, Al, and Ge, Y represents at least one selected from the group consisting of B, P, and Si, A represents at least one selected from the group consisting of Ti, V, Cr, Zn, Mg, Sn, Bi, O, N, S, and a rare earth element, m, x, y, and α satisfy relationships of $0.070 \leq m \leq 0.120$, $0.001 \leq x \leq 0.030$, $0 \leq y \leq 0.010$, and $0 \leq \alpha \leq 0.100$, and the alloy contains Fe-based nanocrystals having an average crystal grain size of 30 nm or less.

17 Claims, No Drawings

SOFT MAGNETIC ALLOY, MAGNETIC CORE, AND MAGNETIC COMPONENT

BACKGROUND OF THE INVENTION

The present invention relates to a soft magnetic alloy, a magnetic core, and a magnetic component.

In recent years, there have been demands for downsizing and low power consumption in electronic or information devices, communication devices, etc., and the demands are getting stronger for the realization of a low-carbon society in the future. With the demands, there have also been demands for downsizing and low energy loss in electronic components to be used in power supply circuits of the electronic or information devices, the communication devices, etc. It has been known that in a magnetic component as electronic components, a magnetic core of the magnetic component is made of a magnetic material having high soft magnetic properties, namely, both a low coercivity (Hc) and a high saturation magnetic flux density (Bs), so that the magnetic component can be downsized and an energy loss can be suppressed to achieve low power consumption.

In order to achieve the downsizing of a magnetic component and a reduction in energy loss, development of a Fe-based soft magnetic alloy material is underway. For example, Patent Document 1 discloses that a Fe-based soft magnetic alloy including transition metals such as Zr and Hf and a metalloid element such as B has predetermined soft magnetic properties and a relatively high saturation magnetic flux density even in a composition having a relatively high Fe concentration.

Patent Document 1: JP H7-335419 A

BRIEF SUMMARY OF THE INVENTION

As the soft magnetic alloy having both a low coercivity and a high saturation magnetic flux density, a soft magnetic alloy has been known in which Fe-based nanocrystals are dispersed in an amorphous solid. Such a soft magnetic alloy is to be obtained by performing a heat treatment on an amorphous precursor (amorphous alloy in which crystals are not contained or amorphous alloy in which fine crystals are present) obtained by rapidly cooling molten metal.

In order to achieve a low coercivity, it is preferable that the amorphous precursor before heat treatment is homogeneous, the deposition of crystals in the amorphous precursor is suppressed, and the amorphous precursor is subjected to a heat treatment to cause fine Fe-based nanocrystals to deposit in an amorphous phase. The reason is that when the crystal grain size of Fe-based nanocrystals is approximately 100 nm or less, the coercivity decreases in proportion to the sixth power of the crystal grain size, which is known.

However, when the deposition of crystals is suppressed, there is a tendency that a conversion of an amorphous solid to crystals by a heat treatment is unlikely to occur. Since the magnetization amount of an amorphous phase is smaller than the magnetization amount of Fe-based nanocrystals, when the amount of conversion to crystals is small (when the crystal conversion rate is low), the saturation magnetic flux density of the soft magnetic alloy decreases.

The soft magnetic alloy disclosed in Patent Document 1 has a specific composition and structure, but is not capable of realizing a low coercivity and a high saturation magnetic flux density.

The present invention is conceived in view of such circumstances, and an object of the present invention is to provide a soft magnetic alloy capable of attaining both a low coercivity and a high saturation magnetic flux density.

The present inventors have found that when a soft magnetic alloy having a relatively high Fe concentration contains an "M" element and an "X" element to be described later, the crystallization and the refinement of Fe-based nanocrystals can be promoted and Fe-based nanocrystals can be formed at high density.

Namely, an aspect of the present invention is as follows.

[1] There is provided a soft magnetic alloy comprising a composition expressed by a formula of $(Fe_{(1-\alpha)}A_{\alpha})_{(1-m-x-y)}M_mX_xY_y$, in which M represents at least one selected from the group consisting of Zr and Hf, X represents at least one selected from the group consisting of Ni, Mn, Cu, Co, Al, and Ge, Y represents at least one selected from the group consisting of B, P, and Si, A represents at least one selected from the group consisting of Ti, V, Cr, Zn, Mg, Sn, Bi, O, N, S, and a rare earth element, m, x, y, and $\alpha$ satisfy relationships of $0.070 \leq m \leq 0.120$, $0.001 \leq x \leq 0.030$, $0 \leq y \leq 0.010$, and $0 \leq \alpha \leq 0.100$, and the alloy contains Fe-based nanocrystals having an average crystal grain size of 30 nm or less.

[2] In the soft magnetic alloy described in [1], y satisfies a relationship of $0 \leq y \leq 0.005$.

[3] In the soft magnetic alloy described in [1] or [2], X represents at least one selected from the group consisting of Ni and Mn.

[4] In the soft magnetic alloy described in any one of [1] to [3], the Fe-based nanocrystals have a bcc structure, and an expansion value of a (110) plane spacing of the Fe-based nanocrystals with respect to a (110) plane spacing of pure iron having a bcc structure is 0.020 angstroms or less.

[5] There is provided a magnetic core including the soft magnetic alloy described in any one of [1] to [4].

[6] There is provided a magnetic component including the soft magnetic alloy described in any one of [1] to [4], or the magnetic core described in [5].

According to the present invention, the soft magnetic alloy capable of attaining both a high saturation magnetic flux density and a low coercivity can be provided.

DETAILED DESCRIPTION OF THE INVENTION

Hereinafter, the present invention will be described in detail in the following order based on a specific embodiment.

1. Soft magnetic alloy
2. Method for producing soft magnetic alloy
3. Magnetic component (1. Soft Magnetic Alloy)

A soft magnetic alloy according to the present embodiment has a structure in which a large number of Fe-based nanocrystals are dispersed in an amorphous solid. Fe-based nanocrystals have a crystal grain size in nanometer scale, and are crystals having a high Fe concentration. In the present embodiment, the average crystal grain size of Fe-based nanocrystals is more than 0 nm and 30 nm or less, preferably more than 0 nm and 15 nm or less. Since a large number of fine Fe-based nanocrystals are dispersed in the amorphous solid, the soft magnetic alloy according to the present embodiment is capable of exhibiting a high saturation magnetic flux density and a low coercivity.

Subsequently, a composition of the soft magnetic alloy according to the present embodiment will be described in detail.

The composition of the soft magnetic alloy according to the present embodiment is expressed by a composition formula of $(Fe_{(1-\alpha)}A_{\alpha})_{(1-m-x-y)}M_mX_xY_y$.

In the present embodiment, the soft magnetic alloy contains Fe (iron), an “M” element, and an “X” element as essential components.

The “M” element is at least one element selected from the group consisting of Zr (zirconium) and Hf (hafnium).

The “X” element is at least one element selected from the group consisting of Ni (nickel), Mn (manganese), Cu (copper), Co (cobalt), Al (aluminum), and Ge (germanium). It is preferable that the “X” element is at least one element selected from the group consisting of Ni and Mn.

The soft magnetic alloy according to the present embodiment is obtained by performing a heat treatment on an amorphous precursor obtained by rapidly cooling a molten alloy containing the above components.

In the present embodiment, since the molten alloy includes the “M” element, even when the molten alloy is rapidly cooled, an amorphous precursor can be obtained in which the crystallization of Fe is suppressed. In addition, even when such an amorphous precursor is subjected to a heat treatment, and Fe-based nanocrystals deposit in an amorphous solid, the grain growth of Fe-based nanocrystals is suppressed, so that the average crystal grain size of Fe-based nanocrystals can be easily set within the above-described range.

The following reason is considered as the reason the crystallization of Fe is suppressed. Since the atomic radius and the atomic weight of the “M” element are more than those of Fe, when Fe atoms aggregate and deposit as crystals in an alloy, the “M” element works as an obstacle to restrict the movement of the Fe atoms. For this reason, the growth of the crystals due to the aggregation of the Fe atoms is restricted. As a result, a homogeneous amorphous precursor can be formed even in a composition having a high Fe concentration. Further, when the amorphous precursor is subjected to a heat treatment, the refinement of Fe-based nanocrystals is promoted, so that the soft magnetic alloy having a high saturation magnetic flux density and a low coercivity is obtained.

With respect to the “X” element, there is a characteristic that in a temperature range where a heat treatment is performed, enthalpy of mixing (ΔHmix) of the “X” element and Fe is more than enthalpy of mixing (ΔHmix) of the “X” element and the “M” element. Therefore, when the amorphous precursor is subjected to a heat treatment, the “X” element seeks to move away from Fe, and to move toward the “M” element. As a result, the “X” element is located between Fe which forms a stable amorphous solid and the “M” element, and tends to pull Fe and the “M” element away from each other. Therefore, the aggregation of Fe atoms and the accompanying crystallization are promoted.

Such a mechanism causes an amorphous alloy containing Fe, the “M” element, and the “X” element to have a high crystal conversion rate even when a heat treatment is performed at a relatively low temperature. In addition, since a heat treatment is performed at such low temperature, a nucleation process of Fe-based nanocrystals is dominant over a grain growth process of Fe-based nanocrystals, so that fine Fe-based nanocrystals are formed at high density. In addition, since a heat treatment can be performed at such low temperature, side reactions are unlikely to occur, and the formation of secondary phases can be suppressed.

Further, as described above, since Fe and the “M” element are pulled away from each other in a step where the crystallization of Fe-based nanocrystals proceeds, the supersaturated solid solution of the “M” element in Fe-based nanocrystals is also suppressed.

As described above, since the “X” element is contained in addition to the “M” element, problems to be generated during heat treatment of the amorphous precursor can be solved while taking advantage of obtaining a homogeneous amorphous precursor even at a high Fe concentration. As a result, the soft magnetic alloy capable of attaining both a high saturation magnetic flux density and a low coercivity can be obtained.

From the viewpoint of obtaining the above effects, the content ratios of the “M” element and the “X” element satisfy the following range.

In the above composition formula, “m” represents a content ratio of the “M” element. In the present embodiment, “m” satisfies a relationship of $0.070 \leq m \leq 0.120$. “m” is preferably 0.080 or more, more preferably 0.090 or more. In addition, “m” is preferably 0.110 or less.

In a case where “m” is too small or too large, when a molten alloy is rapidly cooled, crystals deposit easily, and a homogeneous amorphous precursor tends not to be obtained. As a result, fine Fe-based nanocrystals tend to be difficult to obtain when an amorphous precursor is subjected to a heat treatment. Therefore, the coercivity of the soft magnetic alloy after heat treatment tends to increase. In addition, when “m” is too large, Fe-based nanocrystals are not formed at high density, so that the saturation magnetic flux density of the soft magnetic alloy after heat treatment tends to decrease.

In the above composition formula, “x” represents a content ratio of the “X” element. In the present embodiment, “x” satisfies a relationship of $0.001 \leq x \leq 0.030$. “x” is preferably 0.005 or more, more preferably 0.010 or more. In addition, “x” is preferably 0.020 or less.

When “x” is too small, fine Fe-based nanocrystals tend not to be sufficiently obtained, and the density of Fe-based nanocrystals responsible for magnetization tends to decrease. As a result, the coercivity of the soft magnetic alloy after heat treatment increases, and the saturation magnetic flux density tends to decrease. On the other hand, when “x” is too large, Fe-based nanocrystals are not formed at high density, so that the saturation magnetic flux density of the soft magnetic alloy after heat treatment tends to decrease.

The soft magnetic alloy according to the present embodiment may contain a “Y” element as an optional component. The “Y” element is at least one element selected from the group consisting of B (boron), P (phosphorus), and Si (silicon).

Since the “Y” element is contained, the formation of a homogeneous amorphous solid is facilitated during liquid phase cooling or gas phase cooling. In addition, the refinement of crystals during heat treatment is also promoted. Particularly, when the soft magnetic alloy contains Si, in addition to the above effects, an effect of reducing the magnetocrystalline anisotropy of Fe-based nanocrystals is obtained. As a result, soft magnetic properties of the soft magnetic alloy tend to be improved.

In the above composition formula, “y” represents a content ratio of the “Y” element. In the present embodiment, “y” satisfies a relationship of $0 \leq y \leq 0.010$. When the soft magnetic alloy contains the “Y” element, “y” satisfies $0 < y \leq 0.010$. When “y” is too large, the saturation magnetic flux density of the soft magnetic alloy tends to decrease, which is not preferable.

“y” is preferably 0.002 or more. In addition, “y” is preferably 0.005 or less, more preferably 0.004 or less.

The soft magnetic alloy according to the present embodiment may contain an "A" element as an optional component. The "A" element is at least one element selected from the group consisting of Ti (titanium), V (vanadium), Cr (chromium), Zn (zinc), Mg (magnesium), Sn (tin), Bi (bismuth), O (oxygen), N (nitrogen), S (sulfur), and a rare earth element. In the present embodiment, the rare earth element is at least one selected from Sc (scandium), Y (yttrium), and elements (lanthanoid) from atomic numbers 57 to 71.

In the above composition formula, "$\alpha$" represents a content ratio of the "A" element. In the present embodiment, "$\alpha$" satisfies $0.000 \le \alpha \le 0.100$. When the soft magnetic alloy contains the "A" element, "$\alpha$" satisfies $0.000 < \alpha \le 0.100$. "$\alpha$" is preferably 0.050 or less, more preferably 0.030 or less.

Even when the soft magnetic alloy according to the present embodiment contains the "A" element within the above range, the above-described effects can be obtained.

In addition, in the above composition formula, "$(1-\alpha)\times(1-m-x-y)$" represents a content ratio of Fe (iron) in the soft magnetic alloy. The content ratio of Fe is not particularly limited as long as m, x, y, and a are within the above ranges. In the present embodiment, the content ratio of Fe "$(1-\alpha)\times(1-m-x-y)$" is preferably 0.85 or more, more preferably 0.88 or more. Since the content ratio of Fe is set within the above range, a high saturation magnetic flux density is easily obtained.

Incidentally, the soft magnetic alloy according to the present embodiment may contain elements other than the above elements as inevitable impurities. For example, the elements other than the above elements may be contained in a total of amount of 0.1% by mass or less with respect to 100% by mass of the soft magnetic alloy.

In addition, in the present embodiment, attention is to be paid to the lattice spacing of Fe-based nanocrystals. In the present embodiment, since Fe-based nanocrystals have a bcc structure, attention is to be paid to the lattice spacing of the bcc structure. Since the soft magnetic alloy according to the present embodiment contains the "M" element having high amorphous forming ability as an element other than Fe, the "M" element and Fe are substantially uniformly dispersed in an amorphous precursor before heat treatment. Since such an "M" element has a slow diffusion rate, when Fe atoms crystallize during heat treatment of the amorphous precursor, the "M" element is incorporated into crystals. As a result, the crystals formed become crystals having a bcc structure in which "M" is supersaturated and solid-soluted.

Since the atomic radius of the "M" element is larger than the atomic radius of Fe, when the "M" element is incorporated into crystals having a bcc structure (hereinafter, also referred to as bcc crystals), the bcc crystals are deformed. Since such deformation of a crystal lattice causes a decrease in magnetization amount, the magnetization amount of bcc crystals deformed due to the solid solution of the "M" element is larger than the magnetization amount of bcc crystals of pure iron. As a result, the saturation magnetic flux density of the soft magnetic alloy tends to decrease.

Therefore, in the present embodiment, an expansion in the lattice spacing of crystals due to the deformation of the bcc crystals which accompanies the solid solution of the "M" element is controlled.

In the present embodiment, a (110) plane spacing of bcc crystals is adopted as the lattice spacing of the bcc crystals. Since the "M" element is not contained in pure iron, the "M" element is not solid-soluted in bcc crystals of the pure iron. Namely, the expansion in the plane spacing due to the solid solution of the "M" element in bcc crystals does not occur. Therefore, this means that the closer the (110) plane spacing of the soft magnetic alloy is to the (110) plane spacing of pure iron, the lower the solid solution ratio of the "M" element in bcc crystals is.

In the present embodiment, a value obtained by subtracting the (110) plane spacing of the pure iron from the (110) plane spacing of the soft magnetic alloy is defined as an expansion value of the (110) plane spacing. The expansion value of the (110) plane spacing is preferably 0.020 angstroms or less, more preferably 0.010 angstroms or less.

As described above, since the soft magnetic alloy contains the "X" element in addition to the "M" element, Fe and the "M" element are pulled away from each other, and the solid solution of the "M" element in bcc crystals is suppressed. Further, even in the same composition, the expansion value of the (110) plane spacing of bcc crystals is easily set within the above-described range by controlling heat treatment conditions of an amorphous precursor.

Specifically, it is preferable that a heat treatment is performed at an appropriate temperature for a relatively long time. The reason is as follows: since the release of supersaturated solid solution components out of deposited crystals progresses at the same time as the deposition of the crystals in the process of a heat treatment, the release of the supersaturated solid solution components can be promoted by lengthening a heat treatment time. As a result, the expansion value of the plane spacing decreases, and the saturation magnetic flux density is improved as described above.

In addition, a heat treatment may be performed in a plurality of steps. For example, short-time heating is performed at an appropriate temperature to cause fine Fe-based nanocrystals to deposit at high density, and thereafter, a heat treatment is performed at a relatively low temperature for a long time to cause supersaturated solid-solution components to be released out of the Fe-based nanocrystals. Accordingly, a high crystal conversion rate, the deposition of fine Fe-based nanocrystals, and the reduction of expansion of the plane spacing can be achieved in a well-balanced manner.

Incidentally, when a heat treatment is performed at high temperature, supersaturated solid solution components can be released in a short time; however, on the other hand, the crystal grain growth of Fe-based nanocrystals is also promoted, Fe-based nanocrystals become coarse, and thus soft magnetic properties tend to decrease, which is not preferable. On the other hand, in a case where the heat treatment temperature is too low, even when the heat treatment time is lengthened, the crystal conversion rate tends not to increase sufficiently, and the supersaturated solid solution components tend not be sufficiently released. As a result, the saturation magnetic flux density tends to decrease. Therefore, the case of a too high or low heat treatment temperature is not very preferable, and it is preferable that a heat treatment is performed at an optimum temperature at which fine crystal grains deposit and supersaturated solid solution components are sufficiently released.

The (110) plane spacing of the soft magnetic alloy and the (110) plane spacing of pure iron can be calculated by X-Ray diffraction (XRD) measurement. Namely, the (110) plane spacing can be calculated from an angle at which a diffraction peak of the (110) plane is observed and the wavelength of X-rays. Then, an expansion value of the (110) plane spacing may be calculated based on the calculated spacing.

Incidentally, in order to reduce an influence of inherent errors of an XRD measurement device, it is preferable that the (110) plane spacing of the soft magnetic alloy and the (110) plane spacing of pure iron are measured with the same device and under the same conditions.

The shape of the soft magnetic alloy according to the present embodiment is not particularly limited. For example, a thin film shape, a ribbon shape, and a powder shape are provided as an example. The difference in shape is mainly due to a difference in a method for producing a soft magnetic alloy to be described later.

(2. Method for Producing Soft Magnetic Alloy)

Subsequently, a method for producing a soft magnetic alloy will be described. The soft magnetic alloy according to the present embodiment is produced, for example, by causing Fe-based nanocrystals to deposit in an amorphous precursor having the above composition. Examples of a method for obtaining an amorphous precursor include a method for forming an amorphous precursor using a known thin film forming method, and a method for obtaining an amorphous precursor by rapidly cooling molten metal.

In the present embodiment, there will be described a method for obtaining a thin film-shaped amorphous precursor using a known thin film forming method, and producing a thin film-shaped soft magnetic alloy by performing a heat treatment on the obtained amorphous precursor, a method for obtaining a ribbon-shaped amorphous precursor using a roll method, and producing a ribbon-shaped soft magnetic alloy by performing a heat treatment on the obtained amorphous precursor, and a method for obtaining a powder-shaped amorphous precursor using an atomization method, and producing a powder-shaped soft magnetic alloy by performing a heat treatment on the obtained amorphous precursor.

First, the method for producing a soft magnetic alloy using a known thin film forming method will be described. The known thin film forming method is not particularly limited. As the known thin film forming method, there are known vapor deposition methods such as evaporation method, sputtering, physical vapor deposition (PVD) such as pulsed laser deposition, and chemical vapor deposition (CVD). Therefore, a thin film formed by the thin film forming methods is a deposition film formed by decomposing a raw material at an atomic or molecular level, and causing the decomposed raw material to be deposited on a substrate. Hereinafter, the method for producing a soft magnetic alloy using sputtering will be described.

When sputtering is used, a target having a desired composition is used to form a thin film-shaped amorphous precursor on a substrate. As the target, a plurality of targets for each element to be contained in the soft magnetic alloy may be used, or an alloy target containing some or all of the elements may be used. In addition, both the targets for each element and the alloy target may be used.

The substrate is not particularly limited as long as the substrate is made of a material capable of supporting a thin film during heat treatment to be described later, and examples of the substrate include a silicon substrate, a silicon substrate with a thermal oxide film, a ferrite substrate, a non-magnetic ferrite substrate, a sapphire substrate, a glass substrate, and a glass epoxy substrate. In addition, in order to secure adhesion between the substrate and the thin film, a foundation layer may be formed on the substrate.

From the viewpoint of obtaining an amorphous precursor, as film formation conditions, the substrate temperature is preferably 300° C. or less, the pressure during film formation is preferably from 0.1 to 1.0 Pa, and the atmosphere during film formation is preferably an Ar atmosphere.

The thickness of the thin film to be formed is preferably from 10 to 2,000 nm.

Next, the method for producing a soft magnetic alloy using a roll method will be described. In the present embodiment, a single roll method is adopted as the roll method. In the single roll method, first, raw materials of metal elements (pure metal, etc.) to be contained in the soft magnetic alloy is prepared and weighed so as to be a composition of the finally obtained soft magnetic alloy, and the materials are melted to obtain molten metal. Incidentally, a method for melting the materials of the metal elements is not particularly limited, and a method for melting materials by applying high-frequency heating to the materials under a predetermined atmosphere is provided as an example. The temperature of the molten metal may be determined in consideration of the melting point of each metal element, and can be set to, for example, 1,200 to 1,500° C.

Next, for example, the molten metal is sprayed and supplied from a nozzle to a cooled rotary roll in a chamber filled with an inert gas, to produce a ribbon-shaped amorphous precursor in a rotational direction of the rotary roll. Examples of the material of the rotary roll include copper. The temperature of the rotary roll, the rotational speed of the rotary roll, the atmosphere in the chamber, etc. may be determined according to conditions where Fe-based nanocrystals deposit easily in the amorphous solid in heat treatment to be described later.

Next, the method for producing a soft magnetic alloy using an atomization method will be described. In the present embodiment, a gas atomization method is adopted as the atomization method. In the gas atomization method, similarly to the single roll method, first, molten metal in which raw materials of the soft magnetic alloy are melted is obtained. The temperature of the molten metal may be determined, similarly to the single roll method, in consideration of the melting point of each metal element, and can be set to, for example, 1,200 to 1,500° C.

The obtained molten metal is supplied into a chamber as a linear continuous fluid through a nozzle provided at a bottom portion of a crucible, a high-pressure gas is sprayed onto the supplied molten metal to make the molten metal into droplets, and the molten metal droplets are rapidly cooled, so that a powder-shaped amorphous precursor is obtained. The gas spraying temperature, the pressure in the chamber, etc. may be determined according to conditions where Fe-based nanocrystals deposit easily in an amorphous solid in heat treatment to be described later. In addition, the particle size can be adjusted by sieve classification, air flow classification, etc.

The thin film, the ribbon, and the powder obtained by the above methods are composed of the amorphous precursor. The amorphous precursor may be an amorphous alloy in which fine crystals are dispersed in an amorphous solid, or may be an amorphous alloy that does not contain crystals, and it is more preferable that the amorphous precursor is an amorphous alloy that does not contain crystals. Whether or not the thin film, the ribbon, and the powder are composed of an amorphous precursor may be determined by whether or not crystals deposit in an amorphous solid or whether or not fine crystals of a predetermined size or less are formed in an amorphous solid. In the present embodiment, the determination can be made by, for example, X-ray diffraction measurement.

Next, the obtained thin film, ribbon, and powder are subjected to a heat treatment. A soft magnetic alloy in which Fe-based nanocrystals have deposited can be obtained by performing a heat treatment.

In the present embodiment, heat treatment conditions are not particularly limited as long as Fe-based nanocrystals deposit and the average crystal grain size of the Fe-based nanocrystals is within the above-described range under the conditions. For example, a $N_2$ atmosphere or Ar atmosphere can be set in the case of normal pressure, or the pressure can be set to 1 Pa or less in the case of vacuum, the heat treatment temperature can be set to 350 to 700° C., and the holding time can be set to 0 to 5 hours.

From the viewpoint of promoting the release of elements other than Fe that are solid-soluted in Fe-based nanocrystals, and thus reducing the expansion value of the (110) plane spacing, it is preferable that the heat treatment temperature is set to 450 to 600° C. and the holding time is set to 0.5 to 4 hours.

In addition, in order to promote the release of the elements other than Fe that are solid-soluted in the Fe-based nanocrystals, a heat treatment may be performed in a plurality of steps. For example, in an initial heat treatment (first temperature holding step), it is preferable that the heat treatment temperature is set to 450 to 600° C. and the holding time is set to 0.25 to 0.75 hours.

Subsequently, in a next heat treatment (second temperature holding step), it is preferable that the heat treatment temperature is set to 350 to 450° C. and the holding time is set to 0.5 to 2 hours.

After heat treatment, a thin film-shaped soft magnetic alloy in which Fe-based nanocrystals have deposited, a ribbon-shaped soft magnetic alloy in which Fe-based nanocrystals have deposited, and a powder-shaped soft magnetic alloy in which Fe-based nanocrystals have deposited are obtained.

In addition, in the present embodiment, the following method is adopted as a method for calculating an average crystal grain size of Fe-based nanocrystals contained in a soft magnetic alloy obtained by heat treatment. First, a bright-field image at a magnification of $1\times10^5$ times to $1\times10^6$ times is acquired from a thin section sample obtained by ion milling, using a transmission electron microscope. In the acquired bright-field image, the average crystal grain size of Fe-based nanocrystals can be calculated by measuring the diameters of 100 or more crystal grain images, and obtaining an average value of the diameters. The diameter of an individual crystal grain image can be obtained by obtaining an area of the crystal grain image from the number of pixels, and calculating a circle equivalent diameter from the area. When the crystal grain image has a circular shape, the diameter may be measured by a linear distance. In addition, a method for confirming that the crystal structure of Fe-based nanocrystals is a bcc (body-centered cubic) structure is not particularly limited. A confirmation can be made, for example, by performing X-ray diffraction measurement.

(3. Magnetic Component)

A magnetic component according to the present embodiment may contain the above soft magnetic alloy as a magnetic material, or may include a magnetic core composed of the above soft magnetic alloy.

Examples of a method for obtaining a magnetic core from a thin film-shaped soft magnetic alloy include a method for stacking thin film-shaped soft magnetic alloys. Examples of a method for obtaining a magnetic core from a ribbon-shaped soft magnetic alloy include a method for winding a ribbon-shaped soft magnetic alloy and a method for stacking ribbon-shaped soft magnetic alloys. A magnetic core having better properties can be obtained by stacking the thin film-shaped or ribbon-shaped soft magnetic alloys with an insulator interposed therebetween when stacking.

Examples of a method for obtaining a magnetic core from a powder-shaped soft magnetic alloy includes a method for mixing a powder-shaped soft magnetic alloy with a binder, and then pressing the mixture using a mold. In addition, before the powder-shaped soft magnetic alloy is mixed with the binder, an oxidation treatment, an insulation coating treatment, etc. can be applied to surfaces of powder, so that the specific resistance of the magnetic core is improved, and a magnetic core suitable for a higher frequency band is obtained.

The magnetic component according to the present embodiment is suitable for a power inductor to be used in a power supply circuit. In addition, examples of the magnetic component other than the inductor include a transformer, a motor, etc.

The embodiment of the present invention has been described above; however, the present invention is not limited to the embodiment, and may be modified in various forms within the scope of the present invention.

EXAMPLES

Hereinafter, the invention will be described in more detail using examples, but the present invention is not limited to the examples.

Experiment 1

First, raw material metals of a soft magnetic alloy were prepared. The prepared raw material metals were weighed so as to have compositions shown in Table 1, and were subjected to high-frequency heating to be melted, so that a mother alloy was produced.

Thereafter, the produced mother alloy was heated and melted to obtain molten metal having a melting temperature of 1,250° C. A ribbon (amorphous precursor) was produced by spraying the molten metal from a slit nozzle to a rotary roll and rapidly cooling the molten metal using the single roll method. Incidentally, a ribbon having a thickness of 20 μm to 30 μm and a length of several tens of meters was obtained by adjusting the slit width of the slit nozzle, the distance from a slit opening portion to the roll, the material of the rotary roll, and the rotational speed based on a slit width of 180 mm, a distance of 0.2 mm, a material of Cu, and a rotational speed of 25 m/sec as reference settings.

X-ray diffraction measurement was performed on each obtained ribbon to specify whether the amorphous precursor was composed of an amorphous phase or a crystalline phase. Results are shown in Table 1.

Thereafter, a heat treatment was performed on each ribbon under conditions where the pressure in a vacuum state was $2\times10^{-4}$ Pa or less, the heat treatment temperature was 475° C., and the holding time was 1 hour. The ribbon after heat treatment was observed for Fe-based nanocrystals using a transmission electron microscope, and the average crystal grain size of the Fe-based nanocrystals was calculated. Results are shown in Table 1. In addition, ICP analysis confirmed that there was no change in the composition of the alloy before and after heat treatment.

The saturation magnetic flux density and the coercivity of the ribbon after heat treatment were measured by the following method. The saturation magnetic flux density (Bs) was measured in a magnetic field of 1,000 (Oe) using a vibrating-sample magnetometer (VSM). The coercivity (Hc) was measured using an Hc meter.

With respect to the saturation magnetic flux density of the ribbon, a sample having a saturation magnetic flux density of 1.51 T or more was determined to be good. The saturation magnetic flux density of a sample is more preferably 1.60 T or more, further preferably 1.70 T or more. With respect to the coercivity of the ribbon, a sample having a coercivity of less than 15.0 A/m was determined to be good. The coercivity of a sample is more preferably less than 7.0 A/m, further preferably less than 5.0 A/m. Results are shown in Table 1.

Next, a core was produced using the ribbon after heat treatment. First, a ribbon piece having a length of 310 mm in a cast direction was cut out from the ribbon. Next, 120 cutout ribbon pieces were punched in a toroidal shape having an outer diameter of 18 mm and an inner diameter of 10 mm, and the punched ribbon pieces were stacked to obtain a multilayer toroidal core having a height of approximately 3 mm.

The saturation magnetic flux density (Bs) and the coercivity (Hc) of the multilayer toroidal core were measured using a BH analyzer with DC biasing.

With respect to the saturation magnetic flux density of the core, a sample having a saturation magnetic flux density of 1.26 T or more was determined to be good. The saturation magnetic flux density of a sample is more preferably 1.36 T or more, further preferably 1.45 T or more. With respect to the coercivity of the core, a sample having a coercivity of less than 18.0 A/m was determined to be good. The coercivity of a sample is more preferably less than 9.0 A/m, further preferably less than 6.5 A/m. Results are shown in Table 1.

Effects of the present invention are obtained by achieving two items such as a high saturation magnetic flux density and a low coercivity. Therefore, in Table 1 and Tables 2 to 5 to be described later, as will be described below, scores according to measured property values were allocated to each sample, and the superiority or inferiority of each sample was comprehensively evaluated by the numerical value of a product of the scores. Results are shown in a comprehensive evaluation column.

For each ribbon sample, 0 point was allocated when the saturation magnetic flux density was 1.50 T or less, 1 point was allocated when the saturation magnetic flux density was 1.51 T or more and less than 1.60 T, 2 point was allocated when the saturation magnetic flux density was 1.60 T or more and less than 1.70 T, and 3 point was allocated when the saturation magnetic flux density was 1.70 T or more.

In addition, for each ribbon sample, 0 point was allocated when the coercivity was 15.0 A/m or more, 1 point was allocated when the coercivity was 7.0 A/m or more and less than 15.0 A/m, 2 point was allocated when the coercivity was 5.0 A/m or more and less than 7.0 A/m, and 3 point was allocated when the coercivity was less than 5.0 A/m.

Then, a product of the allocated numerical values was calculated, and a sample in which the numerical value of the product was 1 or more was determined to be good. Namely, when the numerical value of a product was 1 or more, a ribbon-shaped soft magnetic alloy was determined to have both a low coercivity and a high saturation magnetic flux density.

For each core sample, 0 point was allocated when the saturation magnetic flux density was 1.25 T or less, 1 point was allocated when the saturation magnetic flux density was 1.26 T or more and 1.35 T or less, 2 point was allocated when the saturation magnetic flux density was 1.36 T or more and 1.44 T or less, and 3 point was allocated when the saturation magnetic flux density was 1.45 T or more.

In addition, for each core sample, 0 point was allocated when the coercivity was 18.0 A/m or more, 1 point was allocated when the coercivity was 9.0 A/m or more and less than 18.0 A/m, 2 point was allocated when the coercivity was 6.5 A/m or more and less than 9.0 A/m, and 3 point was allocated when the coercivity was less than 6.5 A/m.

Then, a product of the allocated numerical values was calculated, and a sample in which the numerical value of the product was 1 or more was determined to be good. Namely, when the numerical value of a product was 1 or more, a core containing a soft magnetic alloy was determined to have both a low coercivity and a high saturation magnetic flux density.

TABLE 1

| | Composition of soft magnetic alloy $(Fe_{(1-\alpha)}A_{\alpha})_{(1-m-x-y)}M_mX_xY_y$ $\alpha = 0, y = 0$ | | | | | | Properties of ribbon | | |
|---|---|---|---|---|---|---|---|---|---|
| | Fe | M | | X | | Structure of | Average crystal grain size of Fe-based nanocrystals | Saturation magnetic flux density Bs | |
| | 1 − m − x − y | Element | m | Element | x | precursor | (nm) | (T) | Score |
| Example 1 | 0.920 | Zr | 0.070 | Ni | 0.010 | Amorphous phase | 15 | 1.86 | 3 |
| Example 2 | 0.905 | Zr | 0.085 | Ni | 0.010 | Amorphous phase | 14 | 1.79 | 3 |
| Example 3 | 0.890 | Zr | 0.100 | Ni | 0.010 | Amorphous phase | 11 | 1.72 | 3 |
| Example 4 | 0.870 | Zr | 0.120 | Ni | 0.010 | Amorphous phase | 16 | 1.61 | 2 |
| Example 5 | 0.915 | Hf | 0.070 | Ni | 0.015 | Amorphous phase | 15 | 1.83 | 3 |
| Example 6 | 0.885 | Hf | 0.100 | Ni | 0.015 | Amorphous phase | 10 | 1.75 | 3 |
| Example 7 | 0.865 | Hf | 0.120 | Ni | 0.015 | Amorphous phase | 17 | 1.60 | 2 |
| Comparative example 1 | 0.930 | Zr | 0.060 | Ni | 0.010 | Crystalline phase | 35 | 1.88 | 3 |
| Comparative example 2 | 0.860 | Zr | 0.130 | Ni | 0.010 | Crystalline phase | 33 | 1.41 | 0 |
| Comparative example 3 | 0.930 | Hf | 0.060 | Ni | 0.010 | Crystalline phase | 33 | 1.81 | 3 |
| Comparative example 4 | 0.860 | Hf | 0.130 | Ni | 0.010 | Crystalline phase | 32 | 1.39 | 0 |
| Comparative example 5 | 0.890 | Nb | 0.100 | Ni | 0.010 | Crystalline phase | 38 | 1.44 | 0 |

TABLE 1-continued

| | Properties of ribbon | | | Properties of multilayer toroidal core of ribbon | | | | |
|---|---|---|---|---|---|---|---|---|
| | Coercivity | | | Saturation magnetic flux density | | Coercivity | | |
| | Hc (A/m) | Score | Comprehensive evaluation | Bs (T) | Score | Hc (A/m) | Score | Comprehensive evaluation |
| Example 1 | 6.9 | 2 | 6 | 1.57 | 3 | 8.9 | 2 | 6 |
| Example 2 | 6.2 | 2 | 6 | 1.52 | 3 | 8.1 | 2 | 6 |
| Example 3 | 5.6 | 2 | 6 | 1.48 | 3 | 7.5 | 2 | 6 |
| Example 4 | 6.7 | 2 | 4 | 1.37 | 2 | 8.5 | 2 | 4 |
| Example 5 | 6.6 | 2 | 6 | 1.55 | 3 | 8.8 | 2 | 6 |
| Example 6 | 5.7 | 2 | 6 | 1.50 | 3 | 7.2 | 2 | 6 |
| Example 7 | 6.6 | 2 | 4 | 1.36 | 2 | 8.6 | 2 | 4 |
| Comparative example 1 | 25.0 | 0 | 0 | 1.60 | 3 | 28.1 | 0 | 0 |
| Comparative example 2 | 30.0 | 0 | 0 | 1.15 | 0 | 32.0 | 0 | 0 |
| Comparative example 3 | 23.0 | 0 | 0 | 1.51 | 3 | 25.8 | 0 | 0 |
| Comparative example 4 | 33.0 | 0 | 0 | 1.20 | 0 | 36.1 | 0 | 0 |
| Comparative example 5 | 31.0 | 0 | 0 | 1.10 | 0 | 39.8 | 0 | 0 |

From Table 1, it was confirmed that even when the content ratio of the "M" element was changed within the above-described range, the numerical value of a product was 4 or more.

In contrast, it was confirmed that a low coercivity was not obtained when the content ratio of the "M" element was too small (Comparative Examples 1 and 3). It was confirmed that a high saturation magnetic flux density and a low coercivity were not obtained when the content ratio of the "M" element was too large (Comparative Examples 2 and 4). In addition, it was confirmed that a high saturation magnetic flux density and a low coercivity were not obtained when the "M" element was not the above-described element (Comparative Example 5).

Experiment 2

In samples of Examples 3 and 6, except that "X" element and the content ratio of the "X" element were set to an element and content ratios shown in Table 2, ribbon-shaped soft magnetic alloys and cores obtained by stacking the ribbons were produced in the same manner as in Experiment 1, and the same evaluation as in Experiment 1 was performed. Results are shown in Table 2.

TABLE 2

| | Composition of soft magnetic alloy $(Fe_{(1-\alpha)}A_{\alpha})_{(1-m-x-y)}M_mX_xY_y$, $\alpha = 0$, $y = 0$ | | | | | Properties of ribbon | | |
|---|---|---|---|---|---|---|---|---|
| | Fe | M | | X | | Average crystal grain size of Fe-based nanocrystals | Saturation magnetic flux density | |
| | 1 − m − x − y | Element | m | Element | x | (nm) | Bs (T) | Score |
| Example 8 | 0.899 | Zr | 0.100 | Ni | 0.001 | 18 | 1.61 | 2 |
| Example 9 | 0.897 | Zr | 0.100 | Ni | 0.003 | 17 | 1.68 | 2 |
| Example 10 | 0.895 | Zr | 0.100 | Ni | 0.005 | 11 | 1.71 | 3 |
| Example 3 | 0.890 | Zr | 0.100 | Ni | 0.010 | 11 | 1.72 | 3 |
| Example 11 | 0.885 | Zr | 0.100 | Ni | 0.015 | 13 | 1.73 | 3 |
| Example 12 | 0.880 | Zr | 0.100 | Ni | 0.020 | 14 | 1.70 | 3 |
| Example 13 | 0.870 | Zr | 0.100 | Ni | 0.030 | 16 | 1.62 | 2 |
| Example 14 | 0.899 | Zr | 0.100 | Mn | 0.001 | 15 | 1.63 | 2 |
| Example 15 | 0.897 | Zr | 0.100 | Mn | 0.003 | 16 | 1.65 | 2 |
| Example 16 | 0.895 | Zr | 0.100 | Mn | 0.005 | 14 | 1.70 | 3 |
| Example 17 | 0.890 | Zr | 0.100 | Mn | 0.010 | 12 | 1.71 | 3 |
| Example 18 | 0.885 | Zr | 0.100 | Mn | 0.015 | 14 | 1.73 | 3 |
| Example 19 | 0.880 | Zr | 0.100 | Mn | 0.020 | 14 | 1.70 | 3 |
| Example 20 | 0.870 | Zr | 0.100 | Mn | 0.030 | 19 | 1.65 | 2 |
| Example 21 | 0.895 | Hf | 0.100 | Ni | 0.005 | 14 | 1.70 | 3 |
| Example 6 | 0.885 | Hf | 0.100 | Ni | 0.015 | 10 | 1.75 | 3 |
| Example 22 | 0.880 | Hf | 0.100 | Ni | 0.020 | 13 | 1.73 | 3 |
| Example 23 | 0.895 | Hf | 0.100 | Mn | 0.005 | 12 | 1.70 | 3 |
| Example 24 | 0.885 | Hf | 0.100 | Mn | 0.015 | 11 | 1.72 | 3 |
| Example 25 | 0.880 | Hf | 0.100 | Mn | 0.020 | 13 | 1.72 | 3 |
| Example 26 | 0.895 | Zr | 0.100 | Cu | 0.005 | 20 | 1.59 | 1 |

TABLE 2-continued

| | | | | | | | | |
|---|---|---|---|---|---|---|---|---|
| Example 27 | 0.885 | Zr | 0.100 | Cu | 0.015 | 16 | 1.62 | 2 |
| Example 28 | 0.870 | Zr | 0.100 | Cu | 0.030 | 17 | 1.57 | 1 |
| Example 29 | 0.885 | Zr | 0.100 | Ge | 0.015 | 16 | 1.60 | 2 |
| Example 30 | 0.885 | Zr | 0.100 | Al | 0.015 | 17 | 1.62 | 2 |
| Example 31 | 0.892 | Zr | 0.100 | Co | 0.008 | 20 | 1.62 | 2 |
| Comparative Example 6 | 0.900 | Zr | 0.100 | — | 0.000 | 21 | 1.20 | 0 |
| Comparative Example 7 | 0.860 | Zr | 0.100 | Ni | 0.040 | 22 | 1.47 | 0 |
| Comparative Example 8 | 0.860 | Zr | 0.100 | Mn | 0.040 | 24 | 1.45 | 0 |
| Comparative Example 9 | 0.860 | Zr | 0.100 | Cu | 0.040 | 16 | 1.48 | 0 |
| Comparative Example 10 | 0.860 | Zr | 0.100 | Co | 0.040 | 28 | 1.47 | 0 |
| Comparative Example 11 | 0.860 | Zr | 0.100 | Al | 0.040 | 27 | 1.42 | 0 |
| Comparative Example 12 | 0.860 | Zr | 0.100 | Ge | 0.040 | 25 | 1.40 | 0 |

| | Properties of ribbon | | | Properties of multilayer toroidal core of ribbon | | | | |
|---|---|---|---|---|---|---|---|---|
| | Coercivity | | | Saturation magnetic flux density | | Coercivity | | |
| | Hc (A/m) | Score | Comprehensive evaluation | Bs (T) | Score | Hc (A/m) | Score | Comprehensive evaluation |
| Example 8 | 6.8 | 2 | 4 | 1.38 | 2 | 8.7 | 2 | 4 |
| Example 9 | 6.8 | 2 | 4 | 1.42 | 2 | 8.8 | 2 | 4 |
| Example 10 | 6.0 | 2 | 6 | 1.45 | 3 | 8.0 | 2 | 6 |
| Example 3 | 5.6 | 2 | 6 | 1.48 | 3 | 7.5 | 2 | 6 |
| Example 11 | 5.9 | 2 | 6 | 1.48 | 3 | 7.5 | 2 | 6 |
| Example 12 | 6.4 | 2 | 6 | 1.45 | 3 | 8.3 | 2 | 6 |
| Example 13 | 6.9 | 2 | 4 | 1.39 | 2 | 8.6 | 2 | 4 |
| Example 14 | 6.5 | 2 | 4 | 1.37 | 2 | 8.4 | 2 | 4 |
| Example 15 | 6.6 | 2 | 4 | 1.38 | 2 | 8.7 | 2 | 4 |
| Example 16 | 6.1 | 2 | 6 | 1.46 | 3 | 7.7 | 2 | 6 |
| Example 17 | 5.9 | 2 | 6 | 1.49 | 3 | 7.3 | 2 | 6 |
| Example 18 | 6.2 | 2 | 6 | 1.48 | 3 | 8.1 | 2 | 6 |
| Example 19 | 6.8 | 2 | 6 | 1.45 | 3 | 8.4 | 2 | 6 |
| Example 20 | 6.9 | 2 | 4 | 1.37 | 2 | 8.4 | 2 | 4 |
| Example 21 | 6.2 | 2 | 6 | 1.45 | 3 | 7.6 | 2 | 6 |
| Example 6 | 5.7 | 2 | 6 | 1.50 | 3 | 7.2 | 2 | 6 |
| Example 22 | 6.5 | 2 | 6 | 1.47 | 3 | 8.1 | 2 | 6 |
| Example 23 | 6.6 | 2 | 6 | 1.45 | 3 | 8.6 | 2 | 6 |
| Example 24 | 6.4 | 2 | 6 | 1.46 | 3 | 8.1 | 2 | 6 |
| Example 25 | 6.7 | 2 | 6 | 1.45 | 3 | 8.0 | 2 | 6 |
| Example 26 | 7.8 | 1 | 1 | 1.32 | 1 | 10.9 | 1 | 1 |
| Example 27 | 7.6 | 1 | 2 | 1.36 | 2 | 13.0 | 1 | 2 |
| Example 28 | 8.1 | 1 | 1 | 1.33 | 1 | 11.0 | 1 | 1 |
| Example 29 | 8.2 | 1 | 2 | 1.38 | 2 | 10.8 | 1 | 2 |
| Example 30 | 7.4 | 1 | 2 | 1.37 | 2 | 9.9 | 1 | 2 |
| Example 31 | 8.8 | 1 | 2 | 1.36 | 2 | 12.0 | 1 | 2 |
| Comparative Example 6 | 20.0 | 0 | 0 | 1.08 | 0 | 22.6 | 0 | 0 |
| Comparative Example 7 | 16.0 | 0 | 0 | 1.19 | 0 | 19.2 | 0 | 0 |
| Comparative Example 8 | 18.0 | 0 | 0 | 1.18 | 0 | 20.8 | 0 | 0 |
| Comparative Example 9 | 13.0 | 1 | 0 | 1.22 | 0 | 17.1 | 1 | 0 |
| Comparative Example 10 | 18.0 | 0 | 0 | 1.23 | 0 | 20.2 | 0 | 0 |
| Comparative Example 11 | 15.0 | 0 | 0 | 1.11 | 0 | 20.1 | 0 | 0 |
| Comparative Example 12 | 20.0 | 0 | 0 | 1.20 | 0 | 23.3 | 0 | 0 |

From Table 2, it was confirmed that good properties were obtained when the “X” element and the content ratio of the “X” element were changed. Particularly, it was confirmed that better properties were obtained when Ni or Mn were contained as the “X” element.

On the other hand, it was confirmed that a high saturation magnetic flux density and a low coercivity were not obtained when the “X” element was not contained. In addition, it was confirmed that a high saturation magnetic flux density and a low coercivity were not obtained when the content ratio of the “X” element was too large.

Experiment 3

In samples of Examples 3 and 17, except that the “Y” element shown in Table 3 was contained and the content ratio of the “Y” element was set to content ratios shown in Table 3, ribbon-shaped soft magnetic alloys and cores obtained by stacking the ribbons were produced in the same manner as in Experiment 1 and the same evaluation as in Experiment 1 was performed. Results are shown in Table 3.

TABLE 3

| | Composition of soft magnetic alloy $(Fe_{(1-\alpha)}A_{\alpha})_{(1-m-x-y)}M_mX_xY_y$, $\alpha = 0$ | | | | | | | Properties of ribbon | | |
|---|---|---|---|---|---|---|---|---|---|---|
| | Fe | M | | X | | Y | | Average crystal grain size of Fe-based nanocrystals | Saturation magnetic flux density | |
| | 1 − m − x − y | Element | m | Element | x | Element | y | (nm) | Bs (T) | Score |
| Example 3 | 0.890 | Zr | 0.100 | Ni | 0.010 | — | 0.000 | 11 | 1.72 | 3 |
| Example 32 | 0.888 | Zr | 0.100 | Ni | 0.010 | Si | 0.003 | 9 | 1.71 | 3 |
| Example 33 | 0.885 | Zr | 0.100 | Ni | 0.010 | Si | 0.005 | 10 | 1.70 | 3 |
| Example 34 | 0.880 | Zr | 0.100 | Ni | 0.010 | Si | 0.010 | 11 | 1.62 | 2 |
| Example 35 | 0.888 | Zr | 0.100 | Ni | 0.010 | B | 0.003 | 10 | 1.72 | 3 |
| Example 36 | 0.885 | Zr | 0.100 | Ni | 0.010 | B | 0.005 | 12 | 1.71 | 3 |
| Example 37 | 0.880 | Zr | 0.100 | Ni | 0.010 | B | 0.010 | 13 | 1.65 | 2 |
| Example 38 | 0.887 | Zr | 0.100 | Ni | 0.010 | P | 0.003 | 11 | 1.73 | 3 |
| Example 39 | 0.885 | Zr | 0.100 | Ni | 0.010 | P | 0.005 | 8 | 1.73 | 3 |
| Example 40 | 0.880 | Zr | 0.100 | Ni | 0.010 | P | 0.010 | 8 | 1.66 | 2 |
| Example 17 | 0.890 | Zr | 0.100 | Mn | 0.010 | — | 0.000 | 12 | 1.71 | 3 |
| Example 41 | 0.887 | Zr | 0.100 | Mn | 0.010 | Si | 0.003 | 9 | 1.71 | 3 |
| Example 42 | 0.885 | Zr | 0.100 | Mn | 0.010 | Si | 0.005 | 12 | 1.71 | 3 |
| Example 43 | 0.880 | Zr | 0.100 | Mn | 0.010 | Si | 0.010 | 13 | 1.64 | 2 |
| Example 44 | 0.887 | Zr | 0.100 | Mn | 0.010 | B | 0.003 | 9 | 1.71 | 3 |
| Example 45 | 0.885 | Zr | 0.100 | Mn | 0.010 | B | 0.005 | 11 | 1.70 | 3 |
| Example 46 | 0.880 | Zr | 0.100 | Mn | 0.010 | B | 0.010 | 10 | 1.62 | 2 |
| Example 47 | 0.887 | Zr | 0.100 | Mn | 0.010 | P | 0.003 | 9 | 1.71 | 3 |
| Example 48 | 0.885 | Zr | 0.100 | Mn | 0.010 | P | 0.005 | 8 | 1.71 | 3 |
| Example 49 | 0.880 | Zr | 0.100 | Mn | 0.010 | P | 0.010 | 8 | 1.65 | 2 |
| Comparative Example 13 | 0.875 | Zr | 0.090 | Ni | 0.015 | B | 0.020 | 12 | 1.45 | 0 |
| Comparative Example 14 | 0.865 | Zr | 0.100 | Ni | 0.015 | P | 0.020 | 8 | 1.49 | 0 |
| Comparative Example 15 | 0.865 | Zr | 0.100 | Ni | 0.015 | Si | 0.020 | 11 | 1.42 | 0 |

| | Properties of ribbon | | | Properties of multilayer toroidal core of ribbon | | | | |
|---|---|---|---|---|---|---|---|---|
| | Coercivity | | | Saturation magnetic flux density | | Coercivity | | |
| | Hc (A/m) | Score | Comprehensive evaluation | Bs (T) | Score | Hc (A/m) | Score | Comprehensive evaluation |
| Example 3 | 5.6 | 2 | 6 | 1.48 | 3 | 7.5 | 2 | 6 |
| Example 32 | 4.0 | 3 | 9 | 1.45 | 3 | 5.5 | 3 | 9 |
| Example 33 | 4.7 | 3 | 9 | 1.45 | 3 | 5.4 | 3 | 9 |
| Example 34 | 5.0 | 2 | 4 | 1.38 | 2 | 6.5 | 2 | 4 |
| Example 35 | 4.4 | 3 | 9 | 1.46 | 3 | 6.0 | 3 | 9 |
| Example 36 | 4.9 | 3 | 9 | 1.46 | 3 | 5.9 | 3 | 9 |
| Example 37 | 5.2 | 2 | 4 | 1.42 | 2 | 7.0 | 2 | 4 |
| Example 38 | 3.8 | 3 | 9 | 1.47 | 3 | 5.3 | 3 | 9 |
| Example 39 | 4.2 | 3 | 9 | 1.49 | 3 | 5.2 | 3 | 9 |
| Example 40 | 5.0 | 2 | 4 | 1.41 | 2 | 6.8 | 2 | 4 |
| Example 17 | 5.9 | 2 | 6 | 1.49 | 3 | 7.3 | 2 | 6 |
| Example 41 | 4.3 | 3 | 9 | 1.45 | 3 | 5.7 | 3 | 9 |
| Example 42 | 4.6 | 3 | 9 | 1.46 | 3 | 5.8 | 3 | 9 |
| Example 43 | 5.0 | 2 | 4 | 1.42 | 2 | 6.7 | 2 | 4 |
| Example 44 | 4.2 | 3 | 9 | 1.45 | 3 | 5.8 | 3 | 9 |
| Example 45 | 4.5 | 3 | 9 | 1.45 | 3 | 5.4 | 3 | 9 |
| Example 46 | 5.1 | 2 | 4 | 1.38 | 2 | 6.6 | 2 | 4 |
| Example 47 | 3.9 | 3 | 9 | 1.47 | 3 | 5.0 | 3 | 9 |
| Example 48 | 4.3 | 3 | 9 | 1.47 | 3 | 5.5 | 3 | 9 |
| Example 49 | 5.4 | 2 | 4 | 1.41 | 2 | 7.2 | 2 | 4 |

TABLE 3-continued

| | | | | | | | | |
|---|---|---|---|---|---|---|---|---|
| Comparative Example 13 | 8.0 | 1 | 0 | 1.21 | 0 | 10.0 | 1 | 0 |
| Comparative Example 14 | 7.6 | 1 | 0 | 1.24 | 0 | 9.7 | 1 | 0 |
| Comparative Example 15 | 7.5 | 1 | 0 | 1.18 | 0 | 9.5 | 1 | 0 |

From Table 3, it was confirmed that good properties were obtained when the "Y" element was contained and the content ratio of the "Y" element was within the above-described range. Particularly, it was confirmed that better properties were obtained when the content ratio of the "Y" element was 0.005 or less.

On the other hand, particularly, it was confirmed that the saturation magnetic flux density decreased when the content ratio of the "Y" element was more than the above-described range.

Experiment 4

In the samples of Examples 3 and 17, except that the "A" element and the content ratio of the "A" element were set to an element and content ratios shown in Table 4, ribbon-shaped soft magnetic alloys and cores obtained by stacking ribbons were produced in the same method as in Experiment 1 and the same evaluation as in Experiment 1 was performed. Results are shown in Table 4.

TABLE 4

| | Composition of soft magnetic alloy $(Fe_{(1-\alpha)}A_{\alpha})_{(1-m-x-y)}M_mX_xY_y$, y = 0 | | | | | | | Properties of ribbon | | |
|---|---|---|---|---|---|---|---|---|---|---|
| | Fe | M | | X | | A | | Average crystal grain size of Fe-based nanocrystals | Saturation magnetic flux density | |
| | (1 − α)(1 − m − x − y) | Element | m | Element | x | Element | α(1 − m − x − y) | (nm) | Bs (T) | Score |
| Example 3 | 0.890 | Zr | 0.100 | Ni | 0.010 | — | | 11 | 1.72 | 3 |
| Example 50 | 0.890 | Zr | 0.085 | Ni | 0.010 | Ti | 0.015 | 10 | 1.65 | 2 |
| Example 51 | 0.905 | Zr | 0.085 | Ni | 0.010 | V | 0.015 | 16 | 1.68 | 2 |
| Example 52 | 0.905 | Zr | 0.085 | Ni | 0.010 | Cr | 0.015 | 17 | 1.65 | 2 |
| Example 53 | 0.905 | Zr | 0.085 | Ni | 0.010 | Zn | 0.015 | 20 | 1.70 | 3 |
| Example 54 | 0.905 | Zr | 0.085 | Ni | 0.010 | Mg | 0.015 | 17 | 1.70 | 3 |
| Example 55 | 0.905 | Zr | 0.085 | Ni | 0.010 | Sn | 0.015 | 12 | 1.72 | 3 |
| Example 56 | 0.905 | Zr | 0.085 | Ni | 0.010 | Bi | 0.015 | 16 | 1.67 | 2 |
| Example 57 | 0.905 | Zr | 0.085 | Ni | 0.010 | O | 0.001 | 15 | 1.71 | 3 |
| Example 58 | 0.905 | Zr | 0.085 | Ni | 0.010 | N | 0.002 | 15 | 1.72 | 3 |
| Example 59 | 0.905 | Zr | 0.085 | Ni | 0.010 | S | 0.001 | 13 | 1.73 | 3 |
| Example 17 | 0.890 | Zr | 0.100 | Mn | 0.010 | — | — | 12 | 1.71 | 3 |
| Example 60 | 0.905 | Zr | 0.085 | Mn | 0.010 | Ti | 0.015 | 10 | 1.62 | 2 |
| Example 61 | 0.905 | Zr | 0.085 | Mn | 0.010 | V | 0.015 | 18 | 1.63 | 2 |
| Example 62 | 0.905 | Zr | 0.085 | Mn | 0.010 | Cr | 0.015 | 17 | 1.65 | 2 |
| Example 63 | 0.905 | Zr | 0.085 | Mn | 0.010 | Zn | 0.015 | 14 | 1.71 | 3 |
| Example 64 | 0.905 | Zr | 0.085 | Mn | 0.010 | Mg | 0.015 | 13 | 1.72 | 3 |
| Example 65 | 0.905 | Zr | 0.085 | Mn | 0.010 | Sn | 0.015 | 12 | 1.73 | 3 |
| Example 66 | 0.905 | Zr | 0.085 | Mn | 0.010 | Bi | 0.015 | 18 | 1.66 | 2 |
| Example 67 | 0.905 | Zr | 0.085 | Mn | 0.010 | O | 0.001 | 15 | 1.71 | 3 |
| Example 68 | 0.905 | Zr | 0.085 | Mn | 0.010 | N | 0.002 | 13 | 1.73 | 3 |
| Example 69 | 0.905 | Zr | 0.085 | Mn | 0.010 | S | 0.001 | 16 | 1.72 | 3 |

| | Properties of ribbon | | | Properties of multilayer toroidal core of ribbon | | | | |
|---|---|---|---|---|---|---|---|---|
| | Coercivity | | | Saturation magnetic flux density | | Coercivity | | |
| | Hc (A/m) | Score | Comprehensive evaluation | Bs (T) | Score | Hc (A/m) | Score | Comprehensive evaluation |
| Example 3 | 5.6 | 2 | 6 | 1.48 | 3 | 7.5 | 2 | 6 |
| Example 50 | 4.6 | 3 | 6 | 1.42 | 2 | 5.7 | 3 | 6 |
| Example 51 | 6.0 | 2 | 4 | 1.40 | 2 | 8.7 | 2 | 4 |
| Example 52 | 6.5 | 2 | 4 | 1.39 | 2 | 9.2 | 1 | 2 |
| Example 53 | 6.9 | 2 | 6 | 1.45 | 3 | 9.7 | 1 | 3 |
| Example 54 | 6.6 | 2 | 6 | 1.44 | 2 | 8.0 | 2 | 4 |
| Example 55 | 4.8 | 3 | 9 | 1.42 | 2 | 6.6 | 2 | 4 |
| Example 56 | 6.7 | 2 | 4 | 1.39 | 2 | 8.4 | 2 | 4 |
| Example 57 | 5.5 | 2 | 6 | 1.43 | 2 | 7.0 | 2 | 4 |
| Example 58 | 5.9 | 2 | 6 | 1.48 | 3 | 7.5 | 2 | 6 |
| Example 59 | 5.2 | 2 | 6 | 1.45 | 3 | 6.5 | 2 | 6 |
| Example 17 | 5.9 | 2 | 6 | 1.49 | 3 | 7.3 | 2 | 6 |
| Example 60 | 4.6 | 3 | 6 | 1.38 | 2 | 6.3 | 3 | 6 |

TABLE 4-continued

| | | | | | | | | |
|---|---|---|---|---|---|---|---|---|
| Example 61 | 6.6 | 2 | 4 | 1.37 | 2 | 8.2 | 2 | 4 |
| Example 62 | 6.9 | 2 | 4 | 1.40 | 2 | 8.4 | 2 | 4 |
| Example 63 | 5.5 | 2 | 6 | 1.44 | 2 | 7.3 | 2 | 4 |
| Example 64 | 5.7 | 2 | 6 | 1.45 | 3 | 7.1 | 2 | 6 |
| Example 65 | 4.7 | 3 | 9 | 1.45 | 3 | 6.5 | 2 | 6 |
| Example 66 | 6.6 | 2 | 4 | 1.38 | 2 | 8.2 | 2 | 4 |
| Example 67 | 5.5 | 2 | 6 | 1.44 | 2 | 7.0 | 2 | 4 |
| Example 68 | 5.9 | 2 | 6 | 1.49 | 3 | 7.9 | 2 | 6 |
| Example 69 | 6.6 | 2 | 6 | 1.44 | 2 | 9.0 | 1 | 2 |

From Table 4, it was confirmed that even if the "A" element was contained, good properties were obtained when the content ratio of the "A" element was within the above-described range.

Experiment 5

In the samples of Example 3 and Comparative Example 6, except that heat treatment conditions were set to conditions shown in Table 5, ribbon-shaped soft magnetic alloys and cores obtained by stacking ribbons were produced in the same method as in Experiment 1 and the (110) plane spacings of the soft magnetic alloys were calculated in addition to the same evaluation as in Experiment 1.

The (110) plane spacing was calculated from 2θ of a peak attributed to a (110) plane of a bcc structure among diffraction peaks obtained by XRD measurement, and the wavelength of X-rays for measurement. In addition, the (110) plane spacing of a pure iron sample was calculated under the same conditions as the above XRD measurement, using the same device as a device that used for the above XRD measurement. The expansion value of the (110) plane spacing in each sample of Example 3 and Examples 70 to 86 and Comparative Example 6 and Comparative Examples 16 to 19 was obtained by subtracting the value of the obtained (110) plane spacing of pure iron from the value of the obtained (110) plane spacing of the soft magnetic alloy. Results are shown in Table 5.

TABLE 5

| | | Heat treatment condition | | | | | Structure of ribbon | |
|---|---|---|---|---|---|---|---|---|
| | | | First tempeature holding step | | Second tempeature holding step | | | |
| | Composition of alloy | Pressure (Pa) | Holding tempeature (° C.) | Holding time (min) | Holding tempeature (° C.) | Holding time (min) | Average crystal grain size of Fe-based nanocrystals (nm) | Expansion of 110 plane spacing (Å) |
| Example 70 | Same as Example 3 | $2 \times 10^{-4}$ Pa | 400 | 60 | | | 9 | 0.031 |
| Example 71 | Same as Example 3 | ↑ | 400 | 120 | | | 9 | 0.028 |
| Example 72 | Same as Example 3 | ↑ | 400 | 240 | | | 11 | 0.027 |
| Example 73 | Same as Example 3 | ↑ | 425 | 60 | | | 10 | 0.019 |
| Example 74 | Same as Example 3 | ↑ | 475 | 0 | | | 8 | 0.026 |
| Example 75 | Same as Example 3 | ↑ | 475 | 15 | | | 8 | 0.021 |
| Example 76 | Same as Example 3 | ↑ | 475 | 30 | | | 9 | 0.017 |
| Example 3 | Example 3 | ↑ | 475 | 60 | | | 11 | 0.015 |
| Example 77 | Same as Example 3 | ↑ | 475 | 120 | | | 11 | 0.013 |
| Example 78 | Same as Example 3 | ↑ | 475 | 240 | | | 12 | 0.011 |
| Example 79 | Same as Example 3 | ↑ | 525 | 60 | | | 12 | 0.007 |
| Example 80 | Same as Example 3 | ↑ | 575 | 60 | | | 18 | 0.003 |
| Example 81 | Same as Example 3 | ↑ | 625 | 0 | | | 22 | 0.007 |
| Example 82 | Same as Example 3 | ↑ | 625 | 60 | | | 25 | 0.003 |
| Example 83 | Same as Example 3 | ↑ | 475 | 30 | 400 | 60 | 9 | 0.013 |
| Example 84 | Same as Example 3 | ↑ | 475 | 30 | 400 | 120 | 9 | 0.011 |
| Example 85 | Same as Example 3 | ↑ | 475 | 30 | 400 | 210 | 9 | 0.010 |
| Example 86 | Same as Example 3 | $5 \times 10^{-1}$ Pa | 475 | 60 | | | 25 | 0.015 |
| Comparative Example 16 | Same as Example 3 | $2 \times 10^{-4}$ Pa | 725 | 0 | | | 31 | 0.002 |
| Comparative Example 17 | Same as Example 3 | ↑ | 725 | 60 | | | 38 | 0.001 |
| Comparative Example 6 | Comparative Example 6 | ↑ | 475 | 60 | | | 21 | 0.021 |
| Comparative Example 18 | Same as Comparative Example 6 | ↑ | 475 | 240 | | | 23 | 0.015 |
| Comparative Example 19 | Same as Comparative Example 6 | ↑ | 475 | 30 | 400 | 210 | 21 | 0.013 |

TABLE 5-continued

| | Properties of ribbon | | | | | Properties of multilayer toroidal core of ribbon | | | | |
|---|---|---|---|---|---|---|---|---|---|---|
| | Saturation magnetic flux density | | Coercivity | | | Saturation magnetic flux density | | Coercivity | | |
| | Bs (T) | Score | Hc (A/m) | Score | Comprehensive evaluation | Bs (T) | Score | Hc (A/m) | Score | Comprehensive evaluation |
| Example 70 | 1.53 | 1 | 6.2 | 2 | 2 | 1.30 | 1 | 8.2 | 2 | 2 |
| Example 71 | 1.54 | 1 | 6.5 | 2 | 2 | 1.30 | 1 | 8.7 | 2 | 2 |
| Example 72 | 1.55 | 1 | 6.9 | 2 | 2 | 1.30 | 1 | 8.4 | 2 | 2 |
| Example 73 | 1.62 | 2 | 5.5 | 2 | 4 | 1.36 | 2 | 7.0 | 2 | 4 |
| Example 74 | 1.58 | 1 | 5.3 | 2 | 2 | 1.34 | 1 | 6.7 | 2 | 2 |
| Example 75 | 1.59 | 1 | 4.7 | 3 | 3 | 1.32 | 1 | 5.8 | 3 | 3 |
| Example 76 | 1.70 | 3 | 5.0 | 2 | 6 | 1.45 | 3 | 6.9 | 2 | 6 |
| Example 3 | 1.72 | 3 | 5.6 | 2 | 6 | 1.48 | 3 | 7.5 | 2 | 6 |
| Example 77 | 1.75 | 3 | 5.9 | 2 | 6 | 1.50 | 3 | 7.2 | 2 | 6 |
| Example 78 | 1.79 | 3 | 6.0 | 2 | 6 | 1.51 | 3 | 8.1 | 2 | 6 |
| Example 79 | 1.75 | 3 | 6.8 | 2 | 6 | 1.49 | 3 | 8.8 | 2 | 6 |
| Example 80 | 1.79 | 3 | 7.0 | 1 | 3 | 1.51 | 3 | 9.3 | 1 | 3 |
| Example 81 | 1.77 | 3 | 13.4 | 1 | 3 | 1.51 | 3 | 15.5 | 1 | 3 |
| Example 82 | 1.75 | 3 | 12.9 | 1 | 3 | 1.49 | 3 | 15.9 | 1 | 3 |
| Example 83 | 1.73 | 3 | 5.0 | 2 | 6 | 1.47 | 3 | 6.5 | 2 | 6 |
| Example 84 | 1.75 | 3 | 5.4 | 2 | 6 | 1.49 | 3 | 7.7 | 2 | 6 |
| Example 85 | 1.77 | 3 | 5.3 | 2 | 6 | 1.51 | 3 | 6.7 | 2 | 6 |
| Example 86 | 1.66 | 2 | 13.0 | 1 | 2 | 1.39 | 2 | 16.1 | 1 | 2 |
| Comparative Example 16 | 1.71 | 3 | 17.0 | 0 | 0 | 1.48 | 3 | 20.1 | 0 | 0 |
| Comparative Example 17 | 1.69 | 2 | 25.0 | 0 | 0 | 1.40 | 2 | 32.0 | 0 | 0 |
| Comparative Example 6 | 1.20 | 0 | 20.0 | 0 | 0 | 1.08 | 0 | 22.6 | 0 | 0 |
| Comparative Example 18 | 1.28 | 0 | 18.0 | 0 | 0 | 1.10 | 0 | 22.0 | 0 | 0 |
| Comparative Example 19 | 1.26 | 0 | 16.0 | 0 | 0 | 1.05 | 0 | 24.3 | 0 | 0 |

From Table 5, it was confirmed that when the holding temperature was too high, the expansion value of the (110) plane spacing decreased and the saturation magnetic flux density was improved, but the crystal grain size increased and the coercivity tended to increase. It was confirmed that when the holding temperature is too low, the crystal grain size decreased and the coercivity decreased, but the expansion of the plane spacing increased, and a sufficient saturation magnetic flux density was not obtained even when the holding time was lengthened. On the other hand, it was confirmed that when the holding time was lengthened at an appropriate temperature, the expansion of the plane spacing decreased, the saturation magnetic flux density was improved, and an increase in crystal grain size and an accompanying increase in coercivity were small. Further, it was confirmed that when a first-step heat treatment was performed at an appropriate temperature and then a second-step heat treatment was performed at a relatively low temperature for a long time, Fe-based nanocrystals that were fine and had a small expansion of the plane spacing were obtained, and a soft magnetic alloy having a small coercivity and a high saturation magnetic flux density was obtained.

Experiment 6

In Experiment 6, unlike Experiments 1 to 5 in which ribbon-shaped soft magnetic alloys were produced, a thin film-shaped soft magnetic alloy was produced as follows.

First, each metal element target contained in a soft magnetic alloy or an alloy target and chips were prepared as a target. A thin film having a composition shown in Table 6 and a thickness of 150 nm was formed on a Si wafer with a thermal oxide film using the prepared target and a target on which chips were installed as needed. A magnetron sputter (SPF430H produced by Cannon Anerva) was used as a sputtering device.

As film formation conditions, the substrate temperature was set to 80 to 100° C., the pressure during film formation was set to 0.3 Pa, and the atmosphere during film formation was set to an Ar atmosphere.

X-ray diffraction measurement was performed on the thin film immediately after film formation by the same method as in Experiment 1, to specify whether an amorphous precursor was composed of an amorphous phase or a crystalline phase. Results are shown in Table 6.

A heat treatment was performed on the obtained thin film under the same conditions as in Experiment 1, namely, conditions where the pressure in a vacuum state was $2\times10^{-4}$ Pa or less, the heat treatment temperature was 475° C., and the holding time was 1 hour. The thin film after heat treatment was observed for Fe-based nanocrystals using a transmission electron microscope, and the average crystal grain size of the Fe-based nanocrystals was calculated. Results are shown in Table 6. In addition, ICP analysis confirmed that there was no change in the composition of the alloy before and after heat treatment.

The saturation magnetic flux density and the coercivity of the thin film after heat treatment were measured by the same method as in Experiment 1.

With respect to the saturation magnetic flux density of the thin film, a sample having a saturation magnetic flux density of 1.47 T or more was determined to be good. The saturation magnetic flux density of a sample is more preferably 1.55 T or more, further preferably 1.65 T or more. With respect to the coercivity of the thin film, a sample having a coercivity of less than 18.0 (Oe) was determined to be good. The coercivity of a sample is more preferably less than 8.5 (Oe), further preferably less than 6.0 (Oe). Unlike the coercivity of the ribbon, the unit of the measured value of the coercivity of the thin film is Elstead. Even in the same composition, a property value changes according to a difference in shape.

Similarly to Experiments 1 to 5, scores according to measured property values were allocated to each sample, and the superiority or inferiority of each sample was comprehensively evaluated by the numerical value of a product of the scores. Results are shown in a comprehensive evaluation column.

For each thin film sample, 0 point was allocated when the saturation magnetic flux density was less than 1.47 T, 1 point was allocated when the saturation magnetic flux density was 1.47 T or more and less than 1.55 T, 2 point was allocated when the saturation magnetic flux density was 1.55 T or more and less than 1.65 T, and 3 point was allocated when the saturation magnetic flux density was 1.65 T or more.

In addition, for each thin film sample, 0 point was allocated when the coercivity was 18.0 (Oe) or more, 1 point was allocated when the coercivity was 8.5 (Oe) or more and less than 18.0 (Oe), 2 point was allocated when the coercivity was 6.0 (Oe) or more and less than 8.5 (Oe), and 3 point was allocated when the coercivity was less than 6.0 (Oe).

Then, a product of the allocated numerical values was calculated, and a sample in which the numerical value of the product was 1 or more was determined to be good. Namely, when the numerical value of a product was 1 or more, a thin film-shaped soft magnetic alloy was determined to have both a low coercivity and a high saturation magnetic flux density.

TABLE 6

| | Composition of soft magnetic alloy (thin film) $(Fe_{(1-\alpha)}A_{\alpha})_{(1-m-x-y)}M_mX_xY_y$, $\alpha = 0$, $y = 0$ | | | | | | Properties of thin film | | | | | |
|---|---|---|---|---|---|---|---|---|---|---|---|---|
| | Fe | M | | X | | | Average crystal grain size of Fe-based nanocrystals | Saturation magnetic flux density | | Coercivity | | Comprehensive evaluation |
| | 1 − m − x − y | Element | m | Element | x | Structure of precursor | (nm) | Bs (T) | Score | Hc (Oe) | Score | |
| Example 87 | 0.920 | Zr | 0.070 | Ni | 0.010 | Amorphous phase | 11 | 1.76 | 3 | 8.0 | 2 | 6 |
| Example 88 | 0.905 | Zr | 0.085 | Ni | 0.010 | Amorphous phase | 11 | 1.72 | 3 | 7.0 | 2 | 6 |
| Example 89 | 0.890 | Zr | 0.100 | Ni | 0.010 | Amorphous phase | 9 | 1.67 | 3 | 6.6 | 2 | 6 |
| Example 90 | 0.870 | Zr | 0.120 | Ni | 0.010 | Amorphous phase | 13 | 1.56 | 2 | 8.2 | 2 | 4 |
| Example 91 | 0.915 | Hf | 0.070 | Ni | 0.015 | Amorphous phase | 11 | 1.75 | 3 | 7.7 | 2 | 6 |
| Example 92 | 0.885 | Hf | 0.100 | Ni | 0.015 | Amorphous phase | 8 | 1.66 | 3 | 6.8 | 2 | 6 |
| Example 93 | 0.865 | Hf | 0.120 | Ni | 0.015 | Amorphous phase | 13 | 1.55 | 2 | 8.2 | 2 | 4 |
| Comparative Example 20 | 0.930 | Zr | 0.060 | Ni | 0.010 | Crystalline phase | 26 | 1.76 | 3 | 26.0 | 0 | 0 |
| Comparative Example 21 | 0.860 | Zr | 0.130 | Ni | 0.010 | Crystalline phase | 24 | 1.37 | 0 | 31.0 | 0 | 0 |
| Comparative Example 22 | 0.930 | Hf | 0.060 | Ni | 0.010 | Crystalline phase | 25 | 1.76 | 3 | 22.0 | 0 | 0 |
| Comparative Example 23 | 0.860 | Hf | 0.130 | Ni | 0.010 | Crystalline phase | 22 | 1.33 | 0 | 33.0 | 0 | 0 |
| Comparative Example 24 | 0.890 | Nb | 0.100 | Ni | 0.010 | Crystalline phase | 29 | 1.37 | 0 | 37.0 | 0 | 0 |

From Table 6, it was confirmed that even when the content ratio of the "M" element was changed within the above-described range, the numerical value of a product was 4 or more.

In contrast, it was confirmed that a low coercivity was not obtained when the content ratio of the "M" element was too small (Comparative Examples 20 and 22). It was confirmed that a high saturation magnetic flux density and a low coercivity were not obtained when the content ratio of the "M" element was too large (Comparative Examples 21 and 23). In addition, it was confirmed that a high saturation magnetic flux density and a low coercivity were not obtained when the "M" element was not the above-described element (Comparative Example 24).

Experiment 7

In samples of Examples 89 and 92, except that the "X" element and the content ratio of the "X" element were set to an element and content ratios shown in Table 7, thin film-shaped soft magnetic alloys were produced in the same manner as in Experiment 6 and the same evaluation as in Experiment 6 was performed. Results are shown in Table 7.

TABLE 7

| | Composition of soft magnetic alloy (thin film) $(Fe_{(1-\alpha)}A_{\alpha})_{(1-m-x-y)}M_mX_xY_y$, $\alpha = 0$, $y = 0$ | | | | | Properties of thin film | | | | | |
|---|---|---|---|---|---|---|---|---|---|---|---|
| | Fe | M | | X | | Average crystal grain size of Fe-based nanocrystals | Saturation magnetic flux density Bs | | Coercivity Hc | | Comprehensive evaluation |
| | 1 − m − x − y | Element | m | Element | x | (nm) | (T) | Score | (Oe) | Score | |
| Example 94 | 0.899 | Zr | 0.100 | Ni | 0.001 | 13 | 1.57 | 2 | 8.0 | 2 | 4 |
| Example 95 | 0.897 | Zr | 0.100 | Ni | 0.003 | 13 | 1.63 | 2 | 8.2 | 2 | 4 |
| Example 96 | 0.895 | Zr | 0.100 | Ni | 0.005 | 8 | 1.67 | 3 | 7.0 | 2 | 6 |
| Example 89 | 0.890 | Zr | 0.100 | Ni | 0.010 | 9 | 1.67 | 3 | 6.6 | 2 | 6 |
| Example 97 | 0.885 | Zr | 0.100 | Ni | 0.015 | 7 | 1.69 | 3 | 7.0 | 2 | 6 |
| Example 98 | 0.880 | Zr | 0.100 | Ni | 0.020 | 11 | 1.65 | 3 | 7.8 | 2 | 6 |
| Example 99 | 0.870 | Zr | 0.100 | Ni | 0.030 | 11 | 1.57 | 2 | 8.0 | 2 | 4 |
| Example 100 | 0.899 | Zr | 0.100 | Mn | 0.001 | 11 | 1.60 | 2 | 8.0 | 2 | 4 |
| Example 101 | 0.897 | Zr | 0.100 | Mn | 0.003 | 12 | 1.61 | 2 | 8.0 | 2 | 4 |
| Example 102 | 0.895 | Zr | 0.100 | Mn | 0.005 | 10 | 1.66 | 3 | 7.5 | 2 | 6 |
| Example 103 | 0.890 | Zr | 0.100 | Mn | 0.010 | 9 | 1.67 | 3 | 7.1 | 2 | 6 |
| Example 104 | 0.885 | Zr | 0.100 | Mn | 0.015 | 11 | 1.68 | 3 | 7.2 | 2 | 6 |
| Example 105 | 0.880 | Zr | 0.100 | Mn | 0.020 | 11 | 1.66 | 3 | 8.4 | 2 | 6 |
| Example 106 | 0.870 | Zr | 0.100 | Mn | 0.030 | 14 | 1.59 | 2 | 8.3 | 2 | 4 |
| Example 107 | 0.895 | Hf | 0.100 | Ni | 0.005 | 11 | 1.65 | 3 | 7.2 | 2 | 6 |
| Example 92 | 0.885 | Hf | 0.100 | Ni | 0.015 | 8 | 1.66 | 3 | 6.8 | 2 | 6 |
| Example 108 | 0.880 | Hf | 0.100 | Ni | 0.020 | 10 | 1.68 | 3 | 7.7 | 2 | 6 |
| Example 109 | 0.895 | Hf | 0.100 | Mn | 0.005 | 9 | 1.65 | 3 | 7.6 | 2 | 6 |
| Example 110 | 0.885 | Hf | 0.100 | Mn | 0.015 | 9 | 1.68 | 3 | 7.8 | 2 | 6 |
| Example 111 | 0.880 | Hf | 0.100 | Mn | 0.020 | 9 | 1.66 | 3 | 8.0 | 2 | 6 |
| Example 112 | 0.895 | Zr | 0.100 | Cu | 0.005 | 15 | 1.52 | 1 | 9.1 | 1 | 1 |
| Example 113 | 0.885 | Zr | 0.100 | Cu | 0.015 | 12 | 1.57 | 2 | 9.1 | 1 | 2 |
| Example 114 | 0.870 | Zr | 0.100 | Cu | 0.030 | 12 | 1.50 | 1 | 10.0 | 1 | 1 |
| Example 115 | 0.885 | Zr | 0.100 | Ge | 0.015 | 11 | 1.55 | 2 | 9.5 | 1 | 2 |
| Example 116 | 0.885 | Zr | 0.100 | Al | 0.015 | 11 | 1.57 | 2 | 8.8 | 1 | 2 |
| Example 117 | 0.892 | Zr | 0.100 | Co | 0.008 | 14 | 1.59 | 2 | 10.5 | 1 | 2 |
| Comparative Example 25 | 0.900 | Zr | 0.100 | — | 0.000 | 17 | 1.16 | 0 | 23.2 | 0 | 0 |
| Comparative Example 26 | 0.860 | Zr | 0.100 | Ni | 0.040 | 18 | 1.45 | 0 | 18.2 | 0 | 0 |
| Comparative Example 27 | 0.860 | Zr | 0.100 | Mn | 0.040 | 19 | 1.41 | 0 | 22.0 | 0 | 0 |
| Comparative Example 28 | 0.860 | Zr | 0.100 | Cu | 0.040 | 13 | 1.44 | 0 | 15.8 | 1 | 0 |
| Comparative Example 29 | 0.860 | Zr | 0.100 | Co | 0.040 | 22 | 1.42 | 0 | 19.0 | 0 | 0 |
| Comparative Example 30 | 0.860 | Zr | 0.100 | Al | 0.040 | 21 | 1.41 | 0 | 18.9 | 0 | 0 |
| Comparative Example 31 | 0.860 | Zr | 0.100 | Ge | 0.040 | 20 | 1.33 | 0 | 21.4 | 0 | 0 |

From Table 7, it was confirmed that good properties were obtained even when the "X" element and the content ratio of the "X" element were changed. Particularly, it was confirmed that better properties were obtained when Ni or Mn were contained as the "X" element.

On the other hand, it was confirmed that a high saturation magnetic flux density and a low coercivity were not obtained when the "X" element was not contained. In addition, it was confirmed that a high saturation magnetic flux density and a low coercivity were not obtained when the content ratio of the "X" element was too large.

Experiment 8

In samples of Examples 89 and 103, except that the "Y" element shown in Table 8 was contained and the content ratio of the "Y" element was set to content ratios shown in Table 8, thin film-shaped soft magnetic alloys were produced in the same manner as in Experiment 6 and the same evaluation as in Experiment 6 was performed. Results are shown in Table 8.

TABLE 8

| | Composition of soft magnetic alloy (thin film) $(Fe_{(1-\alpha)}A_{\alpha})_{(1-m-x-y)}M_mX_xY_y$, α = 0 | | | | | | | Properties of thin film: Average crystal grain size of Fe-based nanocrystals | Saturation magnetic flux density | | Coercivity | | Compre-hensive |
|---|---|---|---|---|---|---|---|---|---|---|---|---|---|
| | Fe | M | | X | | Y | | | Bs | | Hc | | |
| | 1 − m − x − y | Element | m | Element | x | Element | y | (nm) | (T) | Score | (Oe) | Score | evaluation |
| Example 89 | 0.890 | Zr | 0.100 | Ni | 0.010 | — | 0.000 | 9 | 1.67 | 3 | 6.6 | 2 | 6 |
| Example 118 | 0.888 | Zr | 0.100 | Ni | 0.010 | Si | 0.003 | 7 | 1.66 | 3 | 5.2 | 3 | 9 |
| Example 119 | 0.885 | Zr | 0.100 | Ni | 0.010 | Si | 0.005 | 8 | 1.65 | 3 | 5.7 | 3 | 9 |
| Example 120 | 0.880 | Zr | 0.100 | Ni | 0.010 | Si | 0.010 | 8 | 1.55 | 2 | 6.0 | 2 | 4 |
| Example 121 | 0.888 | Zr | 0.100 | Ni | 0.010 | B | 0.003 | 7 | 1.70 | 3 | 5.3 | 3 | 9 |
| Example 122 | 0.885 | Zr | 0.100 | Ni | 0.010 | B | 0.005 | 9 | 1.67 | 3 | 5.9 | 3 | 9 |
| Example 123 | 0.880 | Zr | 0.100 | Ni | 0.010 | B | 0.010 | 10 | 1.59 | 2 | 6.2 | 2 | 4 |
| Example 124 | 0.887 | Zr | 0.100 | Ni | 0.010 | P | 0.003 | 8 | 1.68 | 3 | 5.0 | 3 | 9 |
| Example 125 | 0.885 | Zr | 0.100 | Ni | 0.010 | P | 0.005 | 7 | 1.66 | 3 | 5.1 | 3 | 9 |
| Example 126 | 0.880 | Zr | 0.100 | Ni | 0.010 | P | 0.010 | 7 | 1.59 | 2 | 6.0 | 2 | 4 |
| Example 103 | 0.890 | Zr | 0.100 | Mn | 0.010 | — | 0.000 | 9 | 1.67 | 3 | 6.9 | 2 | 6 |
| Example 127 | 0.887 | Zr | 0.100 | Mn | 0.010 | Si | 0.003 | 8 | 1.69 | 3 | 5.3 | 3 | 9 |
| Example 128 | 0.885 | Zr | 0.100 | Mn | 0.010 | Si | 0.005 | 9 | 1.67 | 3 | 5.8 | 3 | 9 |
| Example 129 | 0.880 | Zr | 0.100 | Mn | 0.010 | Si | 0.010 | 10 | 1.56 | 2 | 6.0 | 2 | 4 |
| Example 130 | 0.887 | Zr | 0.100 | Mn | 0.010 | B | 0.003 | 7 | 1.67 | 3 | 5.0 | 3 | 9 |
| Example 131 | 0.885 | Zr | 0.100 | Mn | 0.010 | B | 0.005 | 8 | 1.66 | 3 | 5.4 | 3 | 9 |
| Example 132 | 0.880 | Zr | 0.100 | Mn | 0.010 | B | 0.010 | 8 | 1.58 | 2 | 6.1 | 2 | 4 |
| Example 133 | 0.887 | Zr | 0.100 | Mn | 0.010 | P | 0.003 | 9 | 1.66 | 3 | 4.2 | 3 | 9 |
| Example 134 | 0.885 | Zr | 0.100 | Mn | 0.010 | P | 0.005 | 8 | 1.65 | 3 | 5.2 | 3 | 9 |
| Example 135 | 0.880 | Zr | 0.100 | Mn | 0.010 | P | 0.010 | 8 | 1.60 | 2 | 6.9 | 2 | 4 |
| Comparative Example 32 | 0.875 | Zr | 0.090 | Ni | 0.015 | B | 0.020 | 10 | 1.42 | 0 | 10.2 | 1 | 0 |
| Comparative Example 33 | 0.865 | Zr | 0.100 | Ni | 0.015 | P | 0.020 | 9 | 1.44 | 0 | 11.0 | 1 | 0 |
| Comparative Example 34 | 0.865 | Zr | 0.100 | Ni | 0.015 | Si | 0.020 | 8 | 1.38 | 0 | 9.0 | 1 | 0 |

From Table 8, it was confirmed that good properties were obtained when the "Y" element was contained and the content ratio of the "Y" element was within the above-described range. Particularly, it was confirmed that better properties were obtained when the content ratio of the "Y" element was 0.005 or less.

On the other hand, it was confirmed that, particularly, the saturation magnetic flux density decreased when the content ratio of the "Y" element was more than the above-described range.

Experiment 9

In the samples of Examples 89 and 103, except that the "A" element and the content ratio of the "A" element were set to an element and content ratios shown in Table 9, thin film-shaped soft magnetic alloys were produced in the same manner as in Experiment 6 and the same evaluation as in Experiment 6 was performed. Results are shown in Table 9.

TABLE 9

| | Composition of soft magnetic alloy (thin film) $(Fe_{(1-\alpha)}A_{\alpha})_{(1-m-x-y)}M_mX_xY_y$, y = 0 | | | | | | | Properties of thin film: Average crystal grain size of Fe-based nanocrystals | Saturation magnetic flux density | | Coercivity | | Compre-hensive |
|---|---|---|---|---|---|---|---|---|---|---|---|---|---|
| | Fe | M | | X | | A | | | Bs | | Hc | | |
| | 1 − m − x − y | Element | m | Element | x | Element | α(1 − m − x − y) | (nm) | (T) | Score | (Oe) | Score | evaluation |
| Example 89 | 0.890 | Zr | 0.100 | Ni | 0.010 | — | | 9 | 1.67 | 3 | 6.6 | 2 | 6 |
| Example 136 | 0.890 | Zr | 0.085 | Ni | 0.010 | Ti | 0.015 | 8 | 1.60 | 2 | 5.5 | 3 | 6 |
| Example 137 | 0.905 | Zr | 0.085 | Ni | 0.010 | V | 0.015 | 12 | 1.62 | 2 | 7.0 | 2 | 4 |
| Example 138 | 0.905 | Zr | 0.085 | Ni | 0.010 | Cr | 0.015 | 13 | 1.60 | 2 | 8.0 | 2 | 4 |
| Example 139 | 0.905 | Zr | 0.085 | Ni | 0.010 | Zn | 0.015 | 16 | 1.67 | 3 | 8.2 | 2 | 6 |
| Example 140 | 0.905 | Zr | 0.085 | Ni | 0.010 | Mg | 0.015 | 12 | 1.66 | 3 | 7.9 | 2 | 6 |
| Example 141 | 0.905 | Zr | 0.085 | Ni | 0.010 | Sn | 0.015 | 9 | 1.65 | 3 | 5.5 | 3 | 9 |
| Example 142 | 0.905 | Zr | 0.085 | Ni | 0.010 | Bi | 0.015 | 12 | 1.61 | 2 | 7.7 | 2 | 4 |
| Example 143 | 0.905 | Zr | 0.085 | Ni | 0.010 | O | 0.001 | 11 | 1.66 | 3 | 6.6 | 2 | 6 |
| Example 144 | 0.905 | Zr | 0.085 | Ni | 0.010 | N | 0.002 | 12 | 1.68 | 3 | 7.1 | 2 | 6 |
| Example 145 | 0.905 | Zr | 0.085 | Ni | 0.010 | S | 0.001 | 10 | 1.70 | 3 | 6.4 | 2 | 6 |
| Example 103 | 0.890 | Zr | 0.100 | Mn | 0.010 | — | — | 9 | 1.67 | 3 | 6.9 | 2 | 6 |
| Example 146 | 0.905 | Zr | 0.085 | Mn | 0.010 | Ti | 0.015 | 8 | 1.57 | 2 | 5.5 | 3 | 6 |
| Example 147 | 0.905 | Zr | 0.085 | Mn | 0.010 | V | 0.015 | 14 | 1.57 | 2 | 7.4 | 2 | 4 |
| Example 148 | 0.905 | Zr | 0.085 | Mn | 0.010 | Cr | 0.015 | 13 | 1.59 | 2 | 8.1 | 2 | 4 |
| Example 149 | 0.905 | Zr | 0.085 | Mn | 0.010 | Zn | 0.015 | 11 | 1.65 | 3 | 6.1 | 2 | 6 |

TABLE 9-continued

| | Composition of soft magnetic alloy (thin film) $(Fe_{(1-\alpha)}A_{\alpha})_{(1-m-x-y)}M_mX_xY_y$, y = 0 | | | | | | | | Properties of thin film | | | | | |
|---|---|---|---|---|---|---|---|---|---|---|---|---|---|---|
| | Fe 1 − m − x − y | M Element | M m | X Element | X x | A Element | A α(1 − m − x − y) | Average crystal grain size of Fe-based nanocrystals (nm) | Saturation magnetic flux density Bs (T) | Saturation magnetic flux density Score | Coercivity Hc (Oe) | Coercivity Score | Comprehensive evaluation |
| Example 150 | 0.905 | Zr | 0.085 | Mn | 0.010 | Mg | 0.015 | 10 | 1.65 | 3 | 7.3 | 2 | 6 |
| Example 151 | 0.905 | Zr | 0.085 | Mn | 0.010 | Sn | 0.015 | 9 | 1.71 | 3 | 5.5 | 3 | 9 |
| Example 152 | 0.905 | Zr | 0.085 | Mn | 0.010 | Bi | 0.015 | 14 | 1.62 | 2 | 7.9 | 2 | 4 |
| Example 153 | 0.905 | Zr | 0.085 | Mn | 0.010 | O | 0.001 | 11 | 1.67 | 3 | 7.1 | 2 | 6 |
| Example 154 | 0.905 | Zr | 0.085 | Mn | 0.010 | N | 0.002 | 10 | 1.66 | 3 | 7.4 | 2 | 6 |
| Example 155 | 0.905 | Zr | 0.085 | Mn | 0.010 | S | 0.001 | 12 | 1.65 | 3 | 8.1 | 2 | 6 |

From Table 9, it was confirmed that even if the "A" element was contained, good properties were obtained when the content ratio of the "A" element was within the above-described range.

Experiment 10

In samples of Example 89 and Comparative Example 25, except that heat treatment conditions were set to conditions shown in Table 10, thin film-shaped soft magnetic alloys were produced in the same manner as in Experiment 6 and similarly to Experiment 5, the (110) plane spacings of the soft magnetic alloys were calculated in addition to the same evaluation as in Experiment 6. Results are shown in Table 10.

TABLE 10

| | Composition of alloy | Heat treatment condition Pressure (Pa) | First tempeature holding step Holding tempeature (° C.) | First tempeature holding step Holding time (min) | Second tempeature holding step Holding tempeature (° C.) | Second tempeature holding step Holding time (min) |
|---|---|---|---|---|---|---|
| Example 156 | Same as Example 89 | $2 \times 10^{-4}$ Pa | 400 | 60 | | |
| Example 157 | Same as Example 89 | ↑ | 400 | 120 | | |
| Example 158 | Same as Example 89 | ↑ | 400 | 240 | | |
| Example 159 | Same as Example 89 | ↑ | 425 | 60 | | |
| Example 160 | Same as Example 89 | ↑ | 475 | 0 | | |
| Example 161 | Same as Example 89 | ↑ | 475 | 15 | | |
| Example 162 | Same as Example 89 | ↑ | 475 | 30 | | |
| Example 89 | Example 89 | ↑ | 475 | 60 | | |
| Example 163 | Same as Example 89 | ↑ | 475 | 120 | | |
| Example 164 | Same as Example 89 | ↑ | 475 | 240 | | |
| Example 165 | Same as Example 89 | ↑ | 525 | 60 | | |
| Example 166 | Same as Example 89 | ↑ | 575 | 60 | | |
| Example 167 | Same as Example 89 | ↑ | 625 | 0 | | |
| Example 168 | Same as Example 89 | ↑ | 625 | 60 | | |
| Example 169 | Same as Example 89 | ↑ | 475 | 30 | 400 | 60 |
| Example 170 | Same as Example 89 | ↑ | 475 | 30 | 400 | 120 |
| Example 171 | Same as Example 89 | ↑ | 475 | 30 | 400 | 210 |
| Comparative Example 35 | Same as Example 89 | $2 \times 10^{-4}$ Pa | 725 | 0 | | |
| Comparative Example 36 | Same as Example 89 | ↑ | 725 | 60 | | |
| Comparative Example 25 | Comparative Example 25 | ↑ | 475 | 60 | | |
| Comparative Example 37 | Same as Comparative Example 25 | ↑ | 475 | 240 | | |
| Comparative Example 38 | Same as Comparative Example 25 | ↑ | 475 | 30 | 400 | 210 |

TABLE 10-continued

| | Structure of thin film | | Properties | | | | |
|---|---|---|---|---|---|---|---|
| | | | Saturation magnetic flux density | | Coercivity | | |
| | Crystal grain size (nm) | Expansion of 110 plane spacing (Å) | Bs (T) | Score | Hc (Oe) | Score | Comprehensive evaluation |
| Example 156 | 8 | 0.035 | 1.49 | 1 | 7.4 | 2 | 2 |
| Example 157 | 8 | 0.032 | 1.51 | 1 | 7.8 | 2 | 2 |
| Example 158 | 10 | 0.029 | 1.53 | 1 | 8.0 | 2 | 2 |
| Example 159 | 9 | 0.025 | 1.56 | 2 | 7.0 | 2 | 4 |
| Example 160 | 8 | 0.027 | 1.53 | 1 | 6.1 | 2 | 2 |
| Example 161 | 8 | 0.026 | 1.54 | 1 | 5.5 | 3 | 3 |
| Example 162 | 9 | 0.019 | 1.65 | 3 | 6.0 | 2 | 6 |
| Example 89 | 10 | 0.017 | 1.67 | 3 | 6.6 | 2 | 6 |
| Example 163 | 10 | 0.016 | 1.70 | 3 | 6.8 | 2 | 6 |
| Example 164 | 11 | 0.014 | 1.73 | 3 | 8.2 | 2 | 6 |
| Example 165 | 11 | 0.010 | 1.70 | 3 | 7.9 | 2 | 6 |
| Example 166 | 13 | 0.006 | 1.74 | 3 | 8.1 | 2 | 6 |
| Example 167 | 19 | 0.009 | 1.70 | 3 | 17.0 | 1 | 3 |
| Example 168 | 21 | 0.004 | 1.69 | 3 | 14.0 | 1 | 3 |
| Example 169 | 9 | 0.017 | 1.66 | 3 | 6.3 | 2 | 6 |
| Example 170 | 9 | 0.015 | 1.67 | 3 | 6.6 | 2 | 6 |
| Example 171 | 9 | 0.015 | 1.70 | 3 | 6.9 | 2 | 6 |
| Comparative Example 35 | 32 | 0.002 | 1.67 | 3 | 20.1 | 0 | 0 |
| Comparative Example 36 | 35 | 0.001 | 1.61 | 2 | 26.8 | 0 | 0 |
| Comparative Example 25 | 17 | 0.026 | 1.16 | 0 | 28.0 | 0 | 0 |
| Comparative Example 37 | 19 | 0.017 | 1.24 | 0 | 20.8 | 0 | 0 |
| Comparative Example 38 | 20 | 0.014 | 1.23 | 0 | 18.8 | 0 | 0 |

From Table 10, it was confirmed that when the holding temperature was too high, the expansion value of the (110) plane spacing decreased and the saturation magnetic flux density was improved, but the crystal grain size increased and the coercivity tended to increase. It was confirmed that when the holding temperature is too low, the crystal grain size decreased and the coercivity decreased, but the expansion of the plane spacing increased, and a sufficient saturation magnetic flux density was not obtained even when the holding time was lengthened. On the other hand, it was confirmed that when the holding time was lengthened at an appropriate temperature, the expansion of the plane spacing decreased, the saturation magnetic flux density was improved, and an increase in crystal grain size and an accompanying increase in coercivity were small. Further, it was confirmed that when a first-step heat treatment was performed at an appropriate temperature and then a second-step heat treatment was performed at a relatively low temperature for a long time, Fe-based nanocrystals that were fine and had a small expansion of the plane spacing were obtained, and thus a soft magnetic alloy having a small coercivity and a high saturation magnetic flux density was obtained.

What is claimed is:

1. A soft magnetic alloy comprising a composition expressed by a formula of $(Fe_{(1-\alpha)}A_{\alpha})_{(1-m-x-y)}M_mX_xY_y$,
   wherein M represents at least one selected from the group consisting of Zr and Hf,
   X represents at least one selected from the group consisting of Ni, Mn, Cu, Co, Al, and Ge,
   Y represents at least one selected from the group consisting of B, P, and Si,
   A represents at least one selected from the group consisting of Ti, V, Cr, Zn, Mg, Sn, Bi, 0, N, S, and a rare earth element,
   m, x, y, and α satisfy relationships of
   $0.070 \leq m \leq 0.120$,
   $0.001 \leq x \leq 0.030$,
   $0 \leq y \leq 0.010$, and
   $0 \leq \alpha \leq 0.100$, and
   the alloy comprises Fe-based nanocrystals having an average crystal grain size of 30 nm or less.
2. The soft magnetic alloy according to claim 1, wherein y satisfies a relationship of $0 \leq y \leq 0.005$.
3. The soft magnetic alloy according to claim 1, wherein X represents at least one selected from the group consisting of Ni and Mn.
4. The soft magnetic alloy according to claim 1, wherein the Fe-based nanocrystals have a bcc structure, and an expansion value of a (110) plane spacing of the Fe-based nanocrystals with respect to a (110) plane spacing of pure iron having a bcc structure is 0.020 angstroms or less.
5. The soft magnetic alloy according to claim 1, wherein a ribbon of the soft magnetic alloy has a saturation magnetic flux density of 1.51 T or more and a coercivity of less than 15.0 A/m.
6. The soft magnetic alloy according to claim 1, wherein a ribbon of the soft magnetic alloy has a saturation magnetic flux density of 1.60 T or more and a coercivity of less than 7.0 A/m.
7. The soft magnetic alloy according to claim 1, wherein a ribbon of the soft magnetic alloy has a saturation magnetic flux density of 1.70 T or more and a coercivity of less than 5.0 A/m.

8. The soft magnetic alloy according to claim 1, wherein $0.090 \leq m \leq 0.110$.

9. The soft magnetic alloy according to claim 1, wherein $0.010 \leq x \leq 0.020$.

10. The soft magnetic alloy according to claim 1, wherein $0 \leq \alpha \leq 0.030$.

11. The soft magnetic alloy according to claim 1, wherein X is at least one of Ni and Mn.

12. A magnetic core comprising:
the soft magnetic alloy according to claim 1.

13. The magnetic core according to claim 12, which has a saturation magnetic flux density of 1.26 T or more and a coercivity of less than 18.0 A/m.

14. The magnetic core according to claim 12, which has a saturation magnetic flux density of 1.36 T or more and a coercivity of less than 9.0 A/m.

15. The magnetic core according to claim 12, which has a saturation magnetic flux density of 1.45 T or more and a coercivity of less than 6.5 A/m.

16. A magnetic component comprising:
the soft magnetic alloy according to claim 1.

17. A magnetic component comprising:
the magnetic core according to claim 12.

* * * * *